(12) United States Patent
Turner et al.

(10) Patent No.: US 9,002,957 B2
(45) Date of Patent: Apr. 7, 2015

(54) PROFILE MESSAGE COMMUNICATIONS

(75) Inventors: Andre R. Turner, Belmont, MA (US); Hong Xiao, Acton, MA (US); Dongchen Wang, Concord, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 312 days.

(21) Appl. No.: 13/095,494

(22) Filed: Apr. 27, 2011

(65) Prior Publication Data

US 2012/0278399 A1 Nov. 1, 2012

(51) Int. Cl.
*G06F 15/16* (2006.01)
*H04W 4/02* (2009.01)
*H04L 12/58* (2006.01)
*H04L 29/08* (2006.01)

(52) U.S. Cl.
CPC ........... *H04W 4/023* (2013.01); *H04L 12/5865* (2013.01); *H04L 67/306* (2013.01)

(58) Field of Classification Search
None
See application file for complete search history.

(56) References Cited

U.S. PATENT DOCUMENTS

| | | | | |
|---|---|---|---|---|
| 7,246,121 | B2 * | 7/2007 | Adar et al. | 1/1 |
| 7,921,174 | B1 * | 4/2011 | Denise | 709/206 |
| 2001/0042132 | A1 * | 11/2001 | Mayadas | 709/238 |
| 2003/0105826 | A1 * | 6/2003 | Mayraz | 709/206 |
| 2008/0119200 | A1 * | 5/2008 | McConnell | 455/456.1 |
| 2009/0216847 | A1 * | 8/2009 | Krishnaswamy et al. | 709/206 |
| 2010/0279667 | A1 * | 11/2010 | Wehrs et al. | 455/414.1 |
| 2010/0280904 | A1 * | 11/2010 | Ahuja | 705/14.58 |
| 2010/0324963 | A1 * | 12/2010 | Gupta et al. | 705/9 |
| 2012/0023178 | A1 * | 1/2012 | Drevon et al. | 709/206 |
| 2012/0239766 | A1 * | 9/2012 | Ye | 709/206 |
| 2012/0265823 | A1 * | 10/2012 | Parmar et al. | 709/206 |

* cited by examiner

*Primary Examiner* — Brian J Gillis
*Assistant Examiner* — Juan C Turriate Gastulo

(57) ABSTRACT

A first user device receives user profile data from a user of the first user device, generates a user profile based on the user profile data, receives profile availability data from the user of the first user device, and designates a user profile availability status based on the profile availability data. A second user device receives target profile data from a user of the second user device, generates a profile message based on the target profile data, and communicates the profile message. The first user device receives the profile message, determines whether the target profile data corresponds to the user profile data of the first user device, generates a user alert when the target profile data corresponds to the user profile data, and enables the user of the first user device to respond to the profile message via a dynamic dashboard.

21 Claims, 21 Drawing Sheets

PROFILE MESSAGE COMMUNICATIONS

BACKGROUND

Currently available communication technologies enable individuals to communicate with one another in a variety of ways. Examples of such communications include speaking over the telephone, text messaging, instant messaging, e-mailing and video conferencing.

DETAILED DESCRIPTION OF PREFERRED EMBODIMENTS

The following detailed description refers to the accompanying drawings. The same reference numbers in different drawings may identify the same or similar elements.

In one or more implementations, described herein, user profiles may be used to search for and communicate with, in real-time, one or more individuals in a given geographic area. In certain implementations, a first user device may communicate with a second user device by broadcasting a profile message in a geographic area. Upon receiving the profile message, the second user device may determine whether the profile message matches a user profile of the second user device. If the profile message is not relevant, then the second user device may disregard the profile message. However, if the profile message matches the user profile of the second user device, then the second user device may notify the user of the second user device and enable the user to respond to the profile message.

Figure 1:
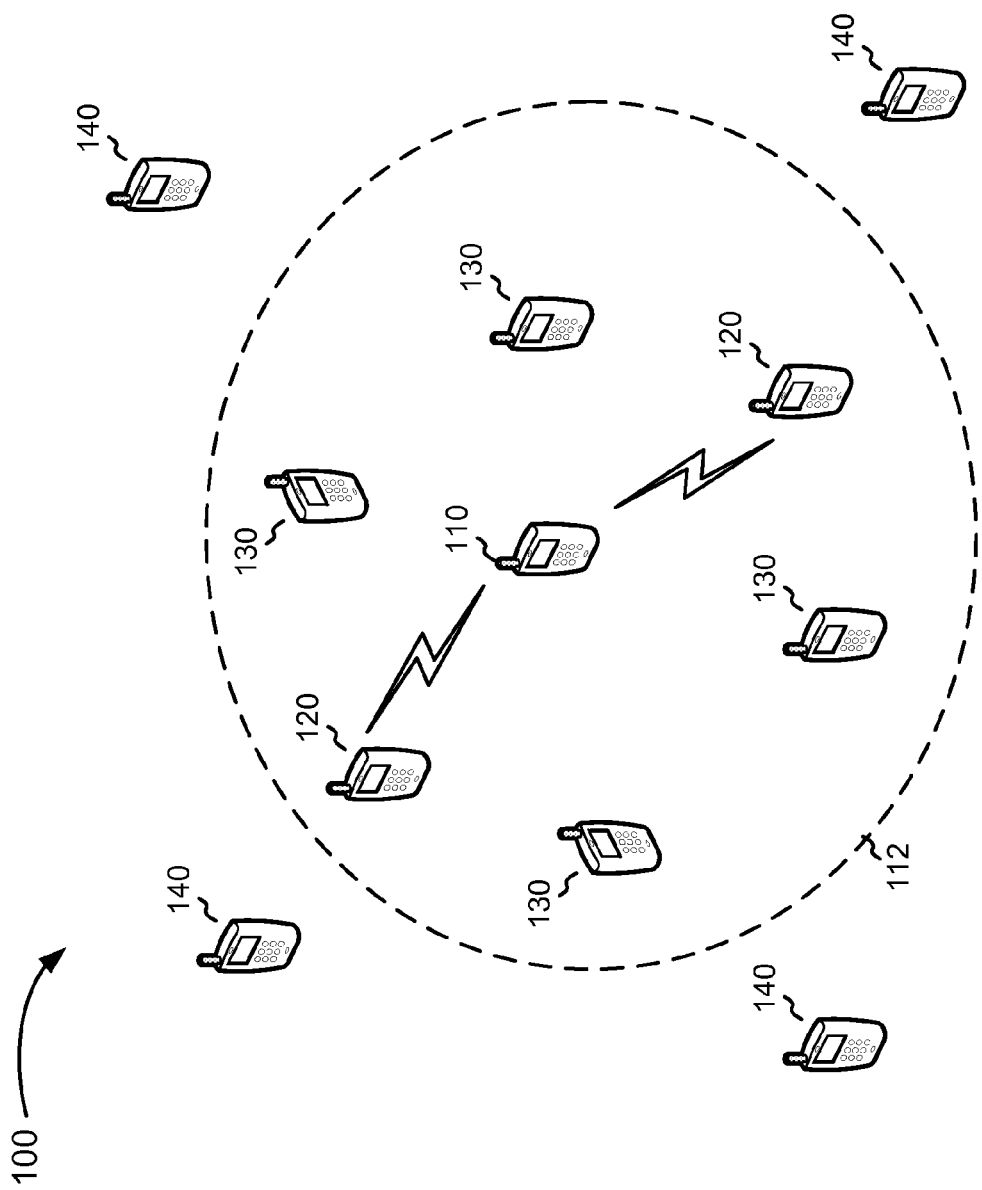
FIG. 1 is a diagram of an overview of an implementation described herein.

FIG. 1 is a diagram of an overview of one or more implementations described herein. In certain implementations, a user device 110 may broadcast a profile message over a geographic area (represented by line 112) specified by the user. User devices that have user profiles matching the profile message, such as user devices 120, may respond to the profile message. In some implementations, the user devices 120 may respond by generating a dynamic dashboard that may enable the user devices 120 to communicate with user device 110, geographically locate user device 110 and/or see if any other user devices have responded to user device 110. User devices, such as user devices 130-140, that are outside the broadcast area 112 or with user profiles that do not match the profile message, may not respond to the profile message.

Figure 2:
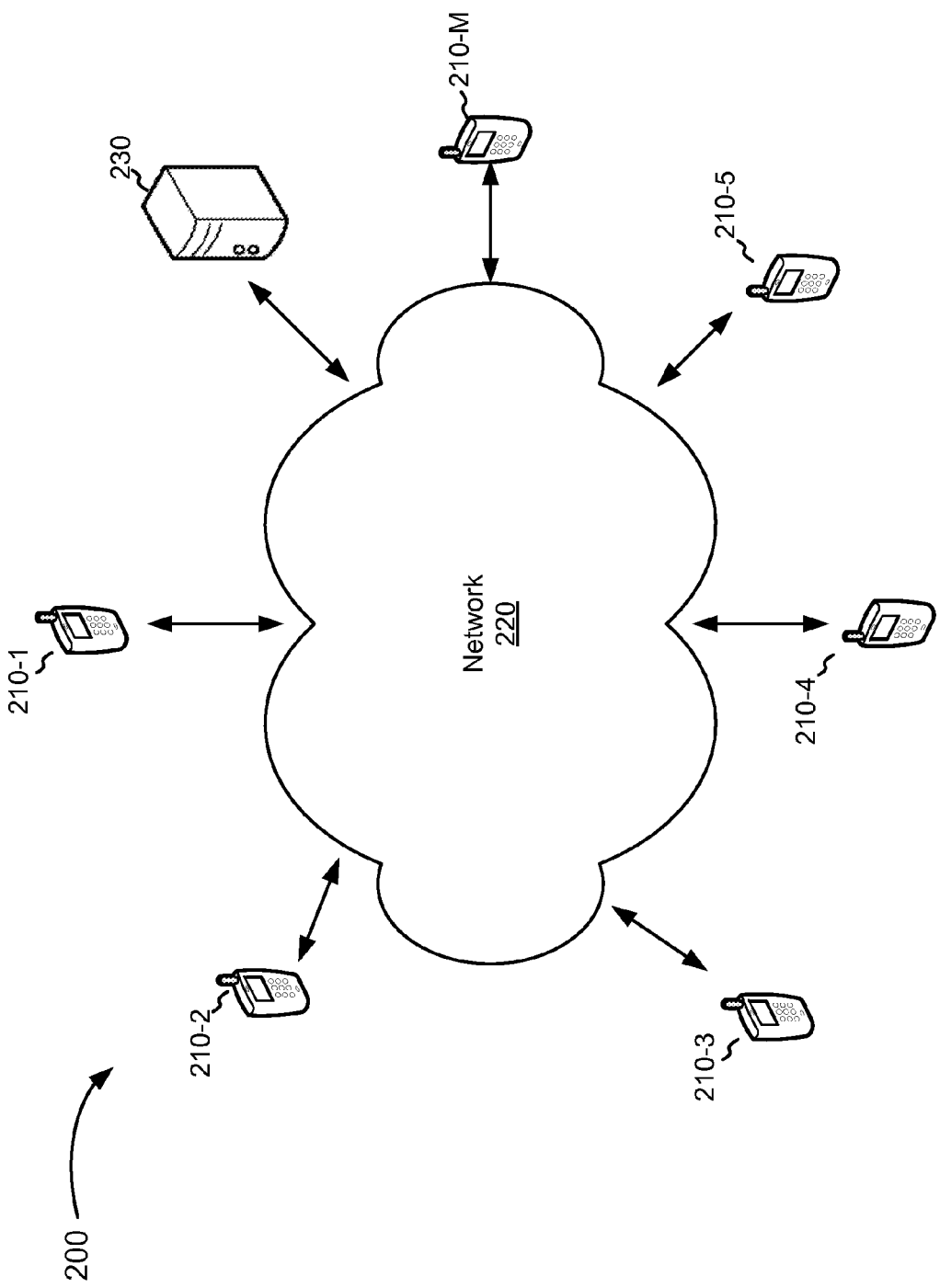
FIG. 2 is a diagram that illustrates an example environment in which systems and/or methods, described herein, may be implemented.

FIG. 2 is a diagram that illustrates an example environment 200 in which systems and/or methods, described herein, may be implemented. As shown in FIG. 2, environment 200 may include user devices 210-1, 210-2, . . . , 210-M (where M≥1) (collectively referred to as "user devices 210," and individually as "user device 210"), a communications network 220 and a profile message server 230. While FIG. 2 shows a particular number and arrangement of devices, in alternative implementations, the environment 200 may include additional, fewer, different or differently arranged devices than those depicted.

User device 210 may be embodied by any number of wireless communication devices. For instance, user device 210 can be a cellular telephone, a smart phone, a laptop computer, a tablet computer, a desktop computer, a personal digital assistant (PDA) or another type of communication device. Additionally, user device 210 may be capable of executing software, storing data, and communicating via communications network 220.

Communication network 220 may include any type of network or a combination of networks. For example, network 220 may include a local area network (LAN), a wide area network (WAN) (e.g., the Internet), a mobile relay network, a metropolitan area network (MAN), an ad hoc network, a telephone network (e.g., a Public Switched Telephone Network (PSTN)), a cellular network, or a voice-over-IP (VoIP) network.

Profile message server 230 may include one or more server devices, such as a computer device, an array of computer devices or one or more databases. Profile message server 230 may be capable of executing software, storing data, and communicating via communications network 220. In certain implementations, the profile message server 230 may play a supportive or management role in enabling user devices 210 to communicate with one another in the manner described herein. However, in other implementations, the profile message serve 230 may not be necessary; that is, the user devices 210 may communicate with one another without the support or management of the profile message server 230. Additionally, in certain implementations, the user devices 210 may communicate with one another via the network 220 (e.g., a telecommunications network or a mobile relay network). However, in other implementations, the user devices 210 may communicate with one another directly. In yet other implementations, whether the user devices 210 communicate with one another directly or via the network 220 may depend on a pre-selected communication medium preference.

Figure 3:
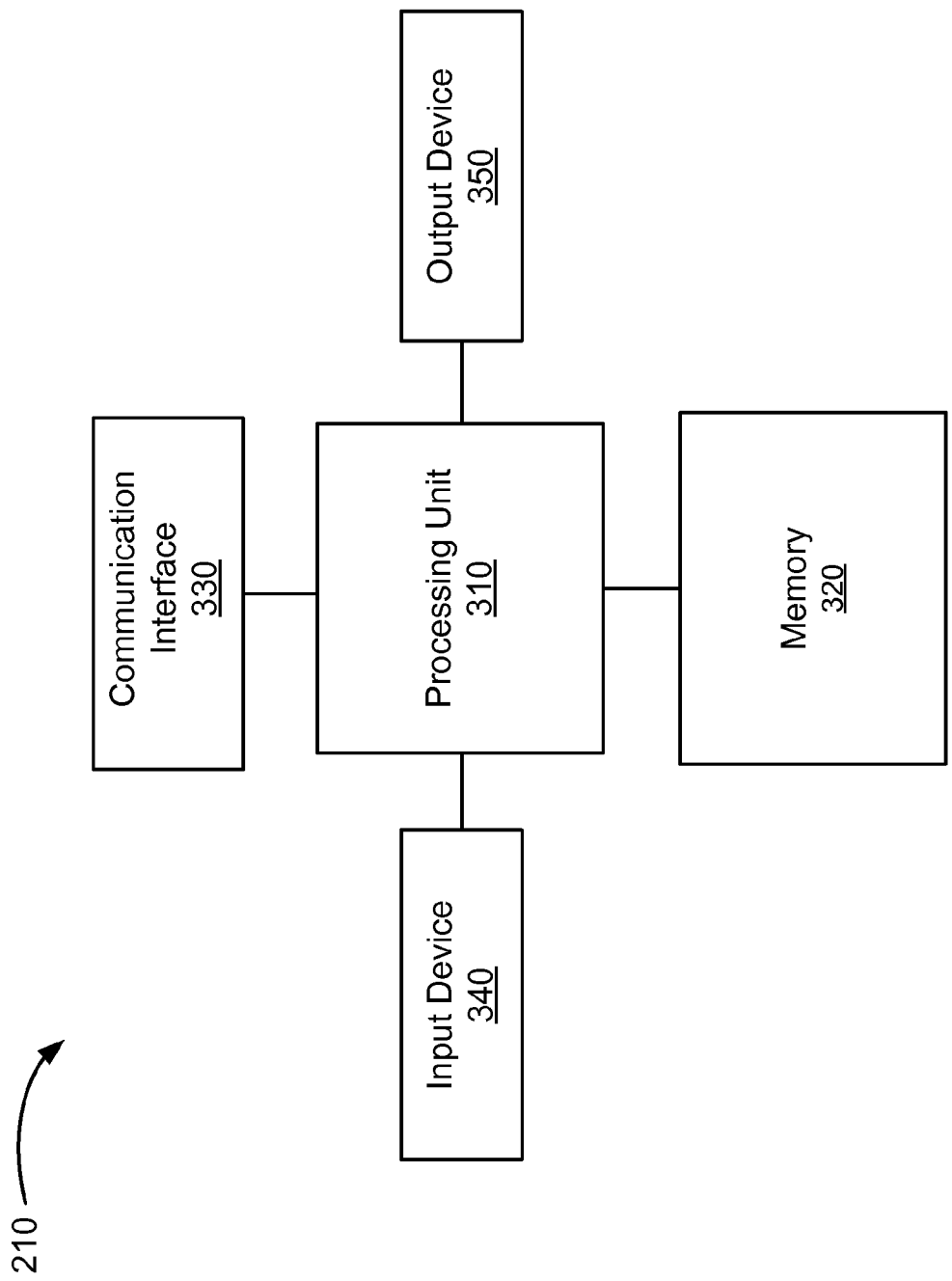
FIG. 3 is a diagram of example components of a user device that may be used within the environment of FIG. 2.

FIG. 3 is a diagram of example components of a user device 210. As depicted, user device 210 may include a processing unit 310, a memory 320, a communication interface 330, an input device 340 and an output device 350. In certain implementations, the user device 210 may correspond to one or more of the user devices depicted in FIGS. 1-2. Additionally, the user device 210 may include fewer, additional, different, or differently arranged components than those illustrated in FIG. 3.

Processing unit 310 may include one or more processors, microprocessors, data processors, co-processors, network processors, application-specific integrated circuits (ASICs), controllers, programmable logic devices (PLDs), chipsets, field-programmable gate arrays (FPGAs), or other components that may interpret or execute instructions or data. Processing unit 310 may control the overall operation, or a portion thereof, of user device 210, based on, for example, an operating system (not illustrated) and/or various applications. Processing unit 310 may access instructions from memory 320, from other components of user device 210 or from a source external to user device 210 (e.g., a network or another device). A computer-readable medium may be defined as a non-transitory memory device. A memory device may include space within a single physical memory device or spread across multiple physical memory devices.

Memory 320 may include memory or secondary storage. For example, memory 320 may include a RAM, a dynamic RAM (DRAM), a read-only memory (ROM), a programmable ROM (PROM), a flash memory or some other type of memory. Memory 320 may include a hard disk (e.g., a magnetic disk, an optical disk, a magneto-optic disk, a solid state disk, etc.) or some other type of computer-readable medium, along with a corresponding drive.

Memory 320 may store data, applications or instructions related to the operation of user device 210. For example, memory 320 may include a variety of applications, such as a navigation application, an e-mail application, a telephone application, a camera application, a voice recognition application, a multi-media application, a music player application, a visual voicemail application, a contacts application, a data organizer application, a calendar application, an instant messaging application, a texting application, a web browsing application, a blogging application or other types of applications (e.g., a word processing application, a spreadsheet application, etc.).

Communication interface 330 may include a component that permits user device 210 to communicate with other devices (e.g., other user devices 210 and/or profile message server 230) or networks (e.g., communications network 220). For example, communication interface 330 may include some type of wireless or wired interface. Communication interface 330 may also include an antenna (or a set of antennas) that permits wireless communication, such as the transmission and reception of radio frequency (RF) signals.

Input device 340 may include a component that permits a user or another device to input information into user device 210. For example, input device 340 may include a keypad, a button, a switch, a knob, fingerprint recognition logic, retinal scan logic, a web cam, voice recognition logic, a touchpad, an input port, a microphone, a display or some other type of input component. Output device 350 may include a component that permits user device 210 to output information to the user or another device. For example, output device 350 may include a display, LEDs, an output port, a speaker or some other type of output component.

As described herein, user device 210 may perform certain operations in response to processing unit 310 executing software instructions contained in a computer-readable medium, such as memory 320. The software instructions may be read into memory 320 from another computer-readable medium or from another device via communication interface 330. The software instructions contained in memory 320 may cause processing unit 310 to perform processes described herein. Alternatively, hardwired circuitry may be used in place of or in combination with software instructions to implement processes described herein. Thus, implementations described herein are not limited to any specific combination of hardware circuitry and software.

Figure 4:
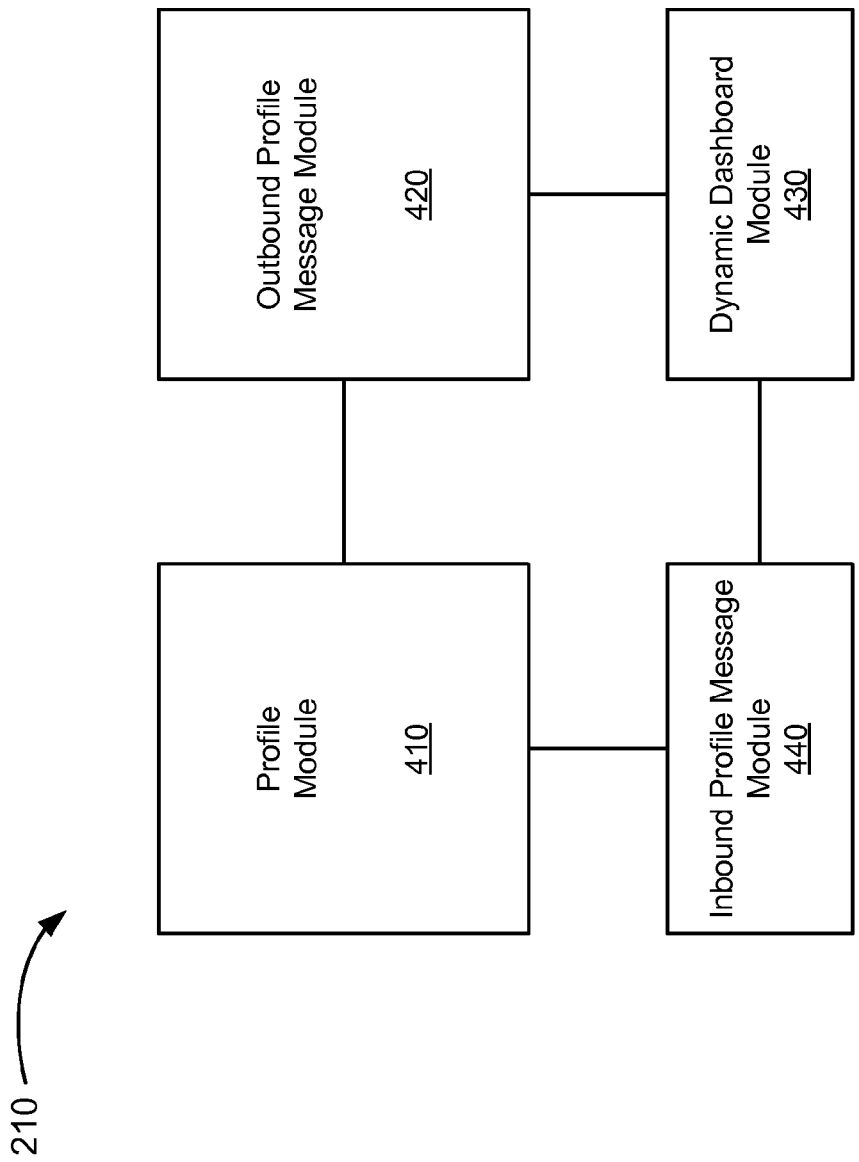
FIG. 4 is a diagram of example functional components of the user device of FIG. 3.

FIG. 4 is a diagram of example functional components of user device 210. As illustrated, user device 210 may include a profile module 410, an outbound profile message module 420, a dynamic dashboard module 430 and an inbound profile message module 440. Depending on the implementation, one or more of the modules 410-440 may be implemented as a combination of hardware and software based on the components illustrated and described with respect to FIG. 3. Alternatively, modules 410-440 may each be implemented as hardware based on the components illustrated and described with respect to FIG. 3. Additionally, while FIG. 4 shows a particular number and arrangement of modules, in alternative implementations, the user device 210 may include additional, fewer, different or differently arranged modules than those depicted.

The profile module 410 may enable the user device 210 to receive user profile data. User profile data may include a wide variety of data relating to a user. Examples of user profile data may include a name, profession (e.g., medical doctor (MD)), job title (e.g., Manager), certifications (e.g., CPA (Certified Public Accountant)), and skills (e.g., automotive repair). Additionally, or alternatively, user profile data may also include contact information, such as street addresses, telephone numbers and e-mail addresses, in addition to information that describes products and/or services of interest (e.g., "need window replacement services."). User profile data may also include one or more key words that can be used to determine whether a given user profile matches a profile message received from another user device. The user profile module 410 may also generate a user profile based on the user profile data, and designate whether the user profile will be made available (e.g., whether the user is willing to receive profile messages from other users). In a similar manner, the profile module 410 may also enable the user device 210 to receive contact profile data, generate contact profiles and designate whether one or more contact profiles will be made available.

The outbound profile message module 420 may enable the user device 210 to receive (e.g., from a user) and/or retrieve (e.g., from memory 320) profile message data that can be used to generate one or more profile messages. Examples of profile message data may include originator data, a message type, target profile data, message content data and geographic data. Originator data may include a name, telephone number and/or other information about the individual broadcasting the profile message. A message type may describe the type or nature of the profile message (e.g., emergency, emergency type, warning, declaration, commercial, non-commercial, etc.). Target profile data may include key words or other information (e.g., names, professions, job titles, certifications, interests, and skills) that may be found in a user profile\of another user device. Message content data may correspond to one or more data formats, including text, audio, images, video and/or any combination thereof. Additionally, or alternatively, message content data may include a request for aid, products or services, a warning, a description, a declaration, a report or an advertisement. In some implementations, the geographic data may include a current location of the user device 210, a geographic distance for broadcasting a profile message and/or information identifying or defining a geographic area or location.

The outbound profile message module 420 may also operate to generate a profile message based on originator data, a message type, target profile data, message content data, and/or geographic data. Additionally, or alternatively, the outbound profile message module 420 may determine an appropriate medium for transmitting the profile message. For instance, if the user device 210 is within range of a telecommunications network, the outbound profile message module 420 may broadcast the profile message via the telecommunications network. However, if the user device 210 is not within range of a telecommunications network, the user device 210 may broadcast the profile message via an alternative route, including a global satellite network, a user device relay network, or a local area network.

The dynamic dashboard module 430 may operate to track recently broadcasted profile messages. In some implementations, this may include receiving messages from other user devices 210 that have received a profile message from the user device 210 and notified their respective users. Additionally, or alternatively, this may also include corresponding with a profile message server 230 that is configured to monitor and/or track user profiles and profile messages. In some implementations, when a profile message sent by the user device 210 matches the user profiles of other users, the dynamic dashboard module 430 may generate a list the user profiles of the other users and enable the user of the user device 210 to communicate with one or more of the other users by selecting the appropriate user profile(s) in the list.

The inbound profile message module 440 may enable the user device 210 to receive a profile message. Similar to the profile message discussed above with respect to the outbound profile message module 420, a profile message, received by the inbound profile message module 440, may include originator data, a message type, target profile data, message content data, geographic data, or other data. The inbound profile message module 440 may also evaluate the profile message to determine whether the user device 210 should notify the user about the profile message, forward the profile message to one or more contacts and/or disregard the profile message.

To do so, the inbound profile message module 440 may consider the profile message's message type (e.g., emergency, warning, declaration, commercial, non-commercial, etc.). Additionally, or alternatively, the inbound profile message module 440 may consider whether a locally stored user profile or contact profiles have been made available, or whether the target profile data or other profile message data match (or are sufficiently relevant to) the key words or other profile data of the user profile. In certain implementations, inbound profile message module 440 may not determine whether a contact profile matches the target profile data before forwarding the profile message to a user device corresponding to the contact profile. In some implementations, the user device of the contact may determine whether the target profile data is sufficiently relevant. In some implementations, the inbound profile message module 440 may also consider whether the user device 210 is currently located within a geographic range, area or distance specified by the profile message. In some embodiments, this may be done by evaluating the geographic data in the profile message and communicating with a telecommunications network, a global satellite network, or other network, to obtain the current geographic location of the user device 210.

Upon notifying the user of a given profile message, the dynamic dashboard module 430 may generate a dynamic dashboard corresponding to the profile message. In certain implementations, the dynamic dashboard may enable the user to communicate with the user originating the profile message, identify the current geographic location of the user originating the profile message and/or determine if any other users have responded to the user originating the profile message. For instance, the dynamic dashboard may enable the user of the user device 210 to contact the user originating the profile message using a telephone call, voicemail, text message, instant message, video conference, or other form of electronic communication.

Additionally, or alternatively, the dynamic dashboard may provide the user of the user device 210 with a map specifying the geographic location of the user originating the profile message and an appropriate route for traveling to the user originating the profile message. Additionally, or alternatively, the dynamic dashboard may provide the user of the user device 210 with a variety of information about whether other users have responded to the user originating the profile message, including the profiles of the other users, the current locations of the other users, the manner in which the other users have responded and more. As such, the dynamic dashboard may provide a wide variety of real-time information, features and functions.

Figure 5:
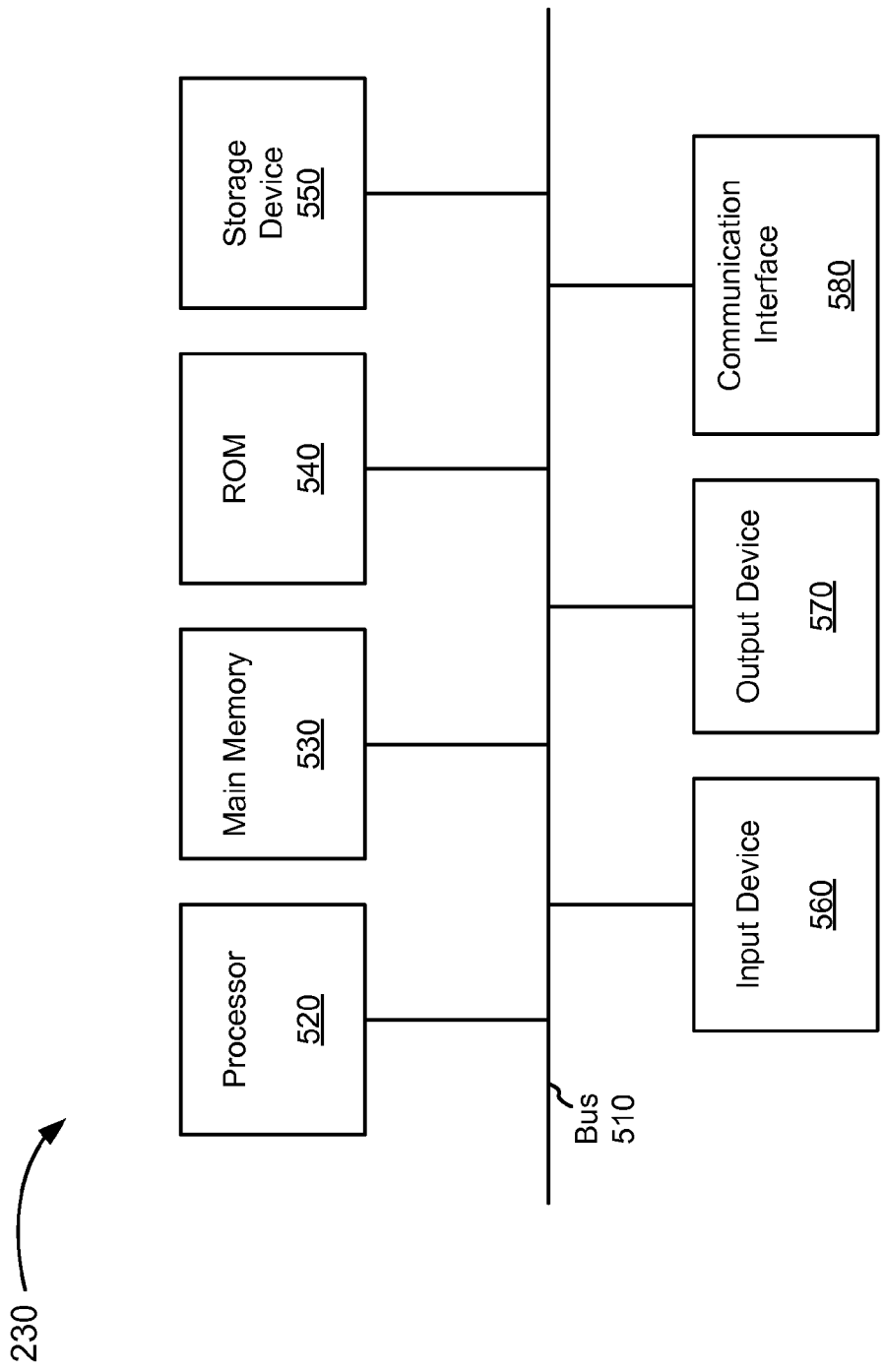
FIG. 5 is a diagram of example components of a profile message server that may be used within the environment of FIG. 2.

FIG. 5 is a block diagram of example components of a profile message server 230. As depicted, profile message server 230 may include a bus 510, a processor 520, a main memory 530, a read-only memory (ROM) 540, a storage device 550, an input device 560, an output device 570, and a communication interface 580. In alternative implementations, however, the profile message server 230 may include fewer, additional, different, or differently arranged components than those illustrated in FIG. 5.

Bus 510 may include a path that permits communication among the components of the profile message server 230. Processor 520 may include a processor, a microprocessor, an application specific integrated circuit (ASIC), a field programmable gate array (FPGA), or another type of processor that interprets and executes instructions. Main memory 530 may include a random access memory (RAM) or another type of dynamic storage device that stores information or instructions for execution by processor 520. ROM 540 may include a ROM device or another type of static storage device that stores static information or instructions for use by processor 520. Storage device 550 may include a magnetic storage medium, such as a hard disk drive, or a removable memory, such as a flash memory.

Input device 560 may include a mechanism that permits a user to input information to profile message server 230, such as a control button, a keyboard, a keypad, or another type of input device. Output device 570 may include a mechanism that outputs information to the user, such as a light emitting diode (LED), a display, or another type of output device. Communication interface 580 may include any transceiver-like mechanism that enables the profile message server 230 to communicate with other devices (e.g., user devices 210) or networks (e.g., network 220). In some implementations, communication interface 580 may include a wireless interface, a wired interface, an optical interface and more.

Profile message server 230 may perform certain operations, as described in detail below. Profile message server 230 may perform these operations in response to processor 520 executing software instructions contained in a computer-readable medium, such as main memory 530.

The software instructions may be read into main memory 530 from another computer-readable medium, such as storage device 550 or from another device via communication interface 580. The software instructions contained in main memory 530 may cause processor 520 to perform processes that will be described later. Alternatively, hardwired circuitry may be used in place of, or in combination with, software instructions to implement processes described herein. Thus, implementations described herein are not limited to any specific combination of hardware circuitry and software.

Figure 6:
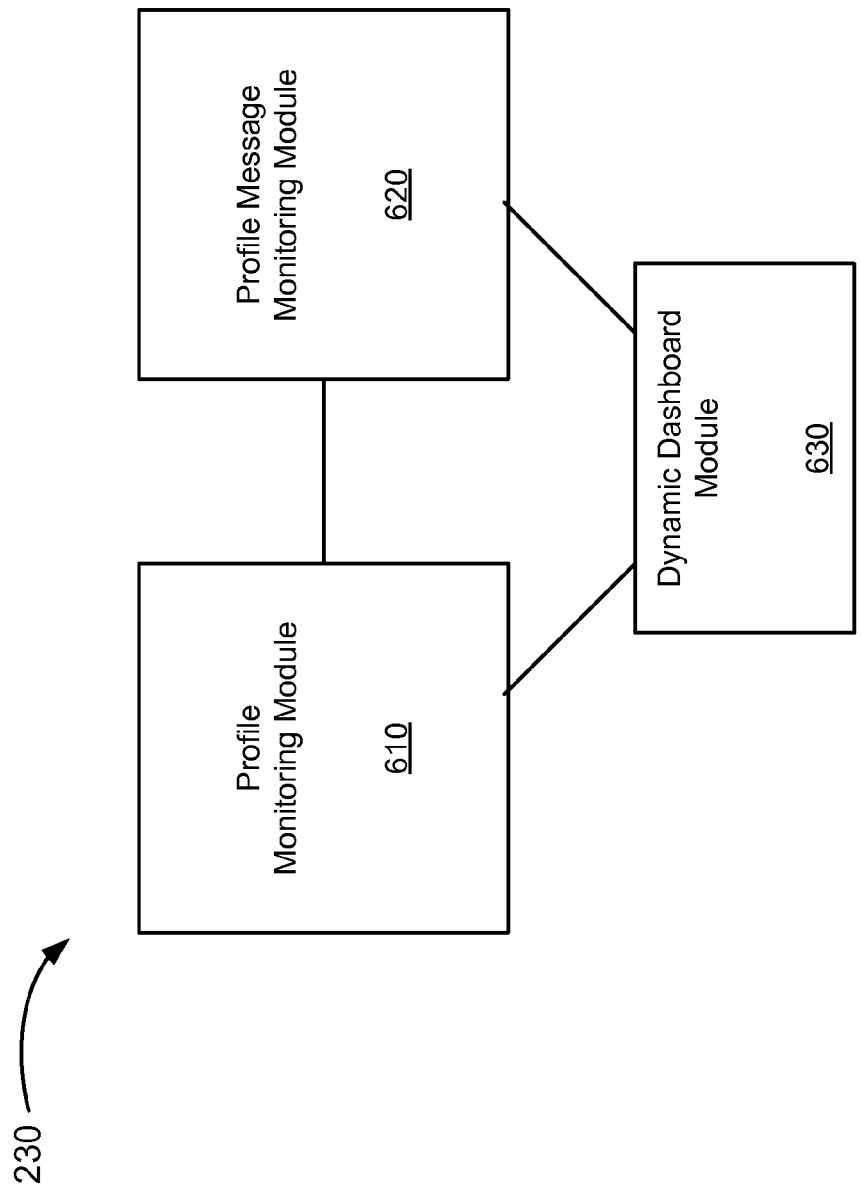
FIG. 6 is a diagram of example functional components of the profile message server of FIG. 5.

FIG. 6 is a diagram of example functional components of a profile message server 230. As depicted, profile message server 230 may include a profile monitoring module 610, a profile message monitoring module 620 and a dynamic dashboard module 630. Depending on the implementation, one or more of modules 610-630 may be implemented as a combination of hardware and software based on the components illustrated and described with respect to FIG. 5. Alternatively, modules 610-630 may each be implemented as hardware based on the components illustrated and described with respect to FIG. 5. Additionally, while FIG. 6 shows a particular number and arrangement of modules, in alternative implementations, the profile message server 230 may include additional, fewer, different or differently arranged modules than those depicted.

Profile monitoring module 610 may enable the profile message server 230 to receive user profiles and contact profiles from user devices 210. In certain implementations, user profiles and contact profiles may be received each time a user creates a new, or edits an existing, user profile or contact profile. Additionally, profile monitoring module 610 may map the user profiles to the contact profiles in order to maintain an accurate record of which user profiles correspond to which contact profiles. In certain implementations, profile monitoring module 610 may also monitor the availability status of each user profile and contact profile. An availability status may determine whether a user of a user device 210 may be contacted via a profile message. If a user modifies the availability status of a user profile or contact profile, the profile monitoring module 610 may receive a notification of the modification in order to keep an accurate record of the availability status of each user profile and each contact profile. In some implementations, profile monitoring module 610 may also monitor the geographic location of user profiles and contact profiles by, for example, monitoring the geographic locations of the user device corresponding thereto.

Profile message monitoring module 620 may enable the profile message server 230 to receive a profile message from a user device 210. As mentioned above, the profile message may include geographic data, including a geographic location of the user device 210 and a broadcast distance for the profile message. In certain implementations, profile message monitoring module 620 may define a broadcast area based on the geographic data in the profile message and generate a list of user profiles and contact profiles within the geographic area. In certain implementations, this may include profile message monitoring module 620 cooperating with profile monitoring module 610, since profile monitoring module 610 may be configured to monitor the geographic locations of user profiles and contact profiles.

Upon identifying the user profiles and the contact profiles in a specified geographic area, profile message monitoring module 620 may also be configured to remove any profiles from the list that are not available. Profile message monitoring module 620 may operate to remove from the list any user profiles or contact profiles that do not match, or are not adequately relevant to the target profile data or other data contained in the profile message. Profile message monitoring module 620 may be configured to broadcast the profile message to any of the remaining user profiles or contact profiles in the list. In some implementations, profile message monitoring module 620 may not determine whether a user profile or contact profile is sufficiently relevant before broadcasting a profile message. In such implementations, this determination may be left to the user devices individually.

Dynamic dashboard module 630 may enable the profile message server 230 to provide dynamic dashboard services with real-time updates, as described herein, to user devices sending profile message and/or user devices receiving profile message.

Figure 7:
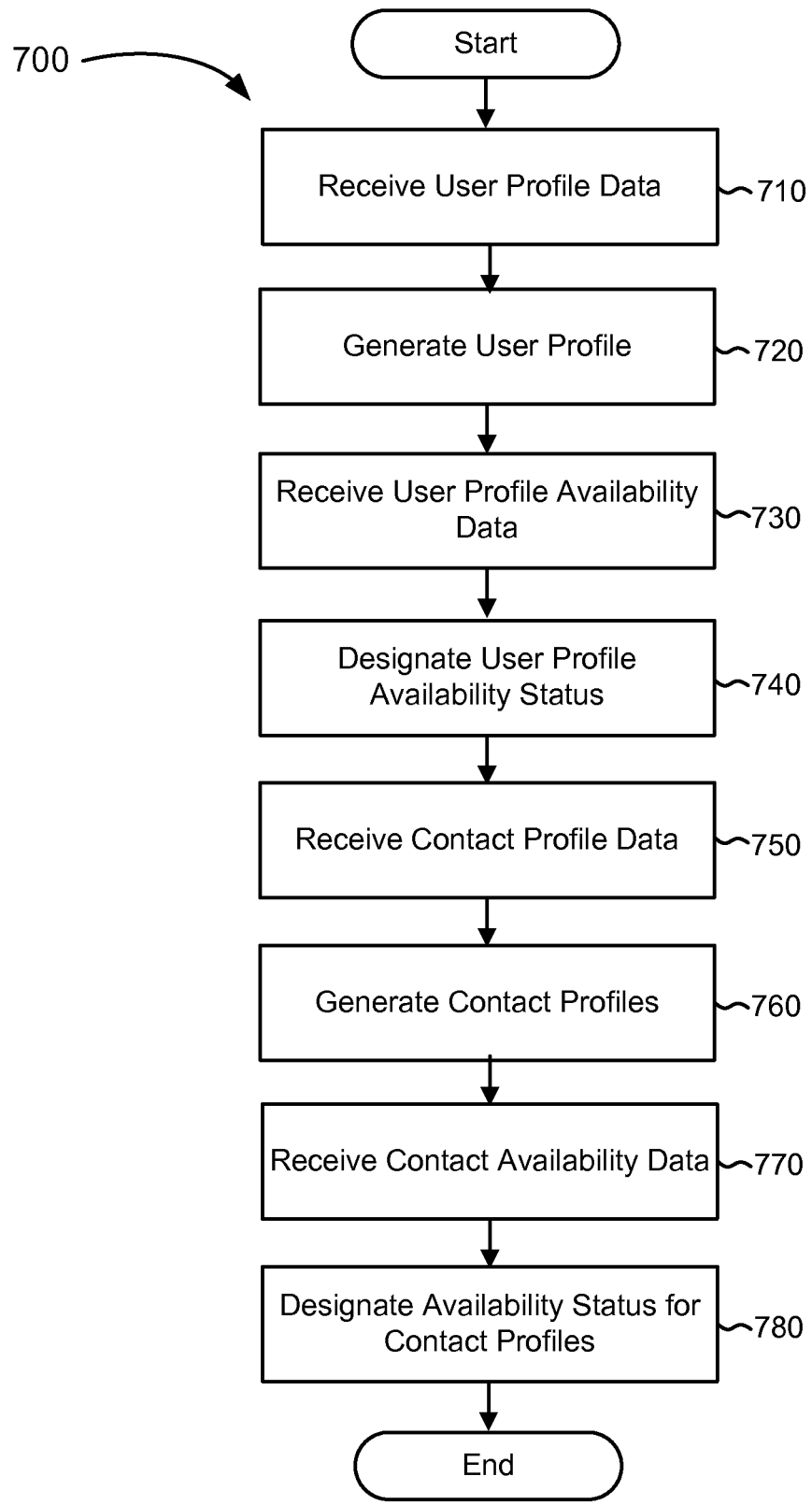
FIG. 7 is a flowchart diagram of an example process for creating a user profile.

FIG. 7 is a flowchart diagram of an example process 700 for creating a user profile and contact profiles. The depicted process 700 includes receiving 710 user profile data, generating 720 a user profile, receiving 730 user profile availability data, designating 740 a user profile availability status, receiving 750 contact profile data, generating 760 contact profiles, receiving 770 contact availability data and designating 780 an availability status for the contact profiles. In certain implementations, process 700 may be performed by one or more components of user device 210, such as processing unit 310. However, in other implementations, process 700 may be performed by the components of one or more other devices, including or excluding user device 210. Process 700 will be described with corresponding references to example user interfaces illustrated in FIGS. 8A-8B.

Receiving 710 user profile data may include presenting a user interface (UI) that enables a user to input user profile data. The UI may implement a variety of user interface technologies, including a graphical UI (GUI), an audio UI or another type of interface. As such, the UI may include any number, variety or combination of interface features, including graphics, descriptions, text boxes, dropdown menus, radio buttons, check boxes, etc. The UI may incorporate one or more dynamic functions, such as user prompts, auto correct functions, spell check functions, data validation functions, audio prompts, audio input functions, etc. Additionally, or alternatively, receiving 710 user profile data may include receiving user profile data in a more automated fashion, such as downloading the user profile data from another device (e.g., a laptop computer), importing the user profile data from a software product or reading the user profile data from a removable storage device (e.g., a subscriber identity module (SIM) card).

As mentioned above, examples of user profile data may include names, professions, job titles, certifications, skills, contact information, or an interest in activities, products and/or services. User profile data may include one or more key words that can be used to determine whether a user profile matches a profile message received from another user device.

Generating 720 a user profile may include using the user profile data to create a data structure that describes a user of a user device 210. In certain implementations, generating 720 a user profile may include storing the user profile, for example, in a memory 320 of a user device 210. Additionally, or alternatively, generating 720 a user profile may include transmitting the user profile to a profile message server 230 for storage.

Similar to receiving 710 user profile data, receiving 730 user profile availability data may include presenting a UI that enables a user to input the profile availability data. Additionally, or alternatively, receiving 730 user profile availability data may include receiving user profile availability data in a more automated fashion, such as downloading user profile availability data from another user device (e.g., a laptop computer) or reading user profile availability data from a removable storage device (e.g., a SIM card). In some implementations, receiving 730 user profile availability data may be executed at the same time as (in combination with) receiving 710 user profile data.

Designating 740 a user profile availability status may include updating or otherwise modifying a user profile data structure to indicate a willingness to receive at least some profile messages and user notifications corresponding thereto. For instance, in certain implementations, the user profile availability status may indicate a willingness to receive profile messages that match, or are sufficiently relevant, to the user profile. In some implementations, while a user profile may be available for receiving profile messages and user notifications, the user profile may not be viewable by other users or user devices. Whether a profile message is sufficiently relevant to a user profile may depend on, for example, an evaluation of factors, including synonyms, acronyms, alternative spellings, potential equivalents, different languages, and/or other factors. However, in other implementations, the user profile availability status may indicate a willingness to receive only certain profile messages (e.g., profile messages with certain profile message types (e.g., emergencies), from certain users, etc.).

Figures 8A, 8B:
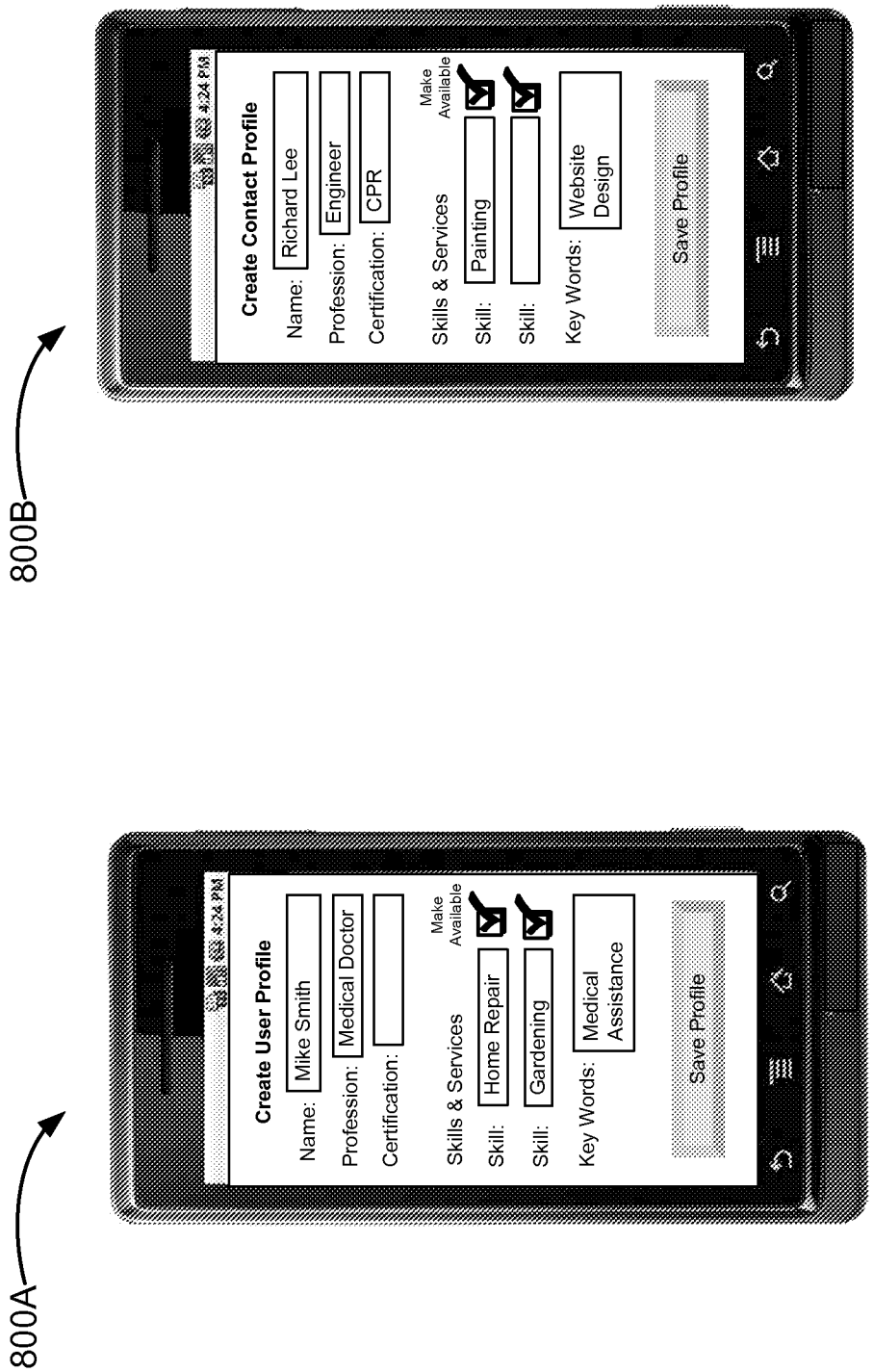
FIGS. 8A-8B are diagrams of example user interfaces for receiving contact profile data and broadcasting a profile message.

FIG. 8A illustrates an example of a UI 800A for receiving user profile data. As depicted, UI 800A includes a number of text boxes that enable the user to input user profile data. Additionally, each text box corresponds to a text box label, such as "Name," "Profession," "Certification," "Skill," and "Key Words," that indicates the type of information that should be entered into each text box. UI 800A also includes check boxes that enable the user to specify whether the user's skills will be made available. While not shown in FIG. 8A, in some implementations, UI 800A may also include a profile availability check box to enable the user to specify the availability of the entire user profile. While FIG. 8A shows a particular number and arrangement of UI features, in alternative implementations, UI 800A may include additional, fewer, different or differently arranged UI features than those depicted.

Returning again to FIG. 7, as mentioned above with respect to receiving 710 user profile data and receiving 730 profile availability data, receiving 750 contact profile data may include presenting a UI that enables manual entry of the contact profile data and/or a more automated data entry process such as downloading, importing or retrieving the contact profile data. Additionally, or alternatively, the contact profile data may be similar in nature and scope to the user profile data mentioned above (e.g., name, profession, job title, certifications, skills, interests, street addresses, telephone numbers, e-mail addresses, etc.).

Generating 760 contact profiles may include one or more operations similar to those used to generate 720 a user profile. For instance, generating 760 contact profiles may include using previously received 750 contact profile data to create data structures that describe one or more contacts of a given user (e.g., relatives, friends, neighbors, colleagues, associates, etc.). In certain implementations, generating 760 contact profiles may include storing the contact profiles in, for example, a memory 320 of user device 210. Additionally, or alternatively, generating 760 contact profiles may include communicating the contact profiles to, for example, a profile message server 230 for storage.

Similar to receiving 730 user profile availability data, receiving 770 contact profile availability data may include presenting a UI that enables a user to input the contact profile availability data. Additionally, or alternatively, receiving 770 contact profile availability data may include receiving profile availability data in a more automated fashion, such as downloading the contact profile availability data from another user device, importing the contact profile availability data from an application or reading the profile availability data from a removable storage device. In some implementations, receiving 770 contact profile availability data may be executed at the same time as, or in combination with, receiving 710 user profile data.

Similar to designating 740 a user profile availability status, designating 770 an availability status for contact profiles may include updating one or more contact profile data structures to indicate a willingness to receive at least some profile messages and user notifications corresponding thereto. In certain implementations, the availability statuses for each contact profile may be designated by the individual. Additionally, or alternatively, some implementations may have an option to designate a collective availability status for all contact profiles. Also, similar to the user profile availability status, the availability status for contact profiles may function as an additional filter for certain profile messages (e.g., commercial profile messages, non-emergency profile messages, etc.).

FIG. 8B illustrates an example of a UI 800B for receiving contact profile data. Similar to the UI of FIG. 8A, UI 800B includes a number of text boxes that can enable a user to input contact profile data. Additionally, each text box corresponds to a text box label, such as "Name," "Profession," "Certification," "Skill," or "Key Words," that indicates the type of information that should be entered into each text box. The UI 800B also includes check boxes that enables the user to specify whether the user's skills will be made available. While FIG. 8B shows a particular number and arrangement of UI features, in alternative implementations, the UI 800B may include additional, fewer, different or differently arranged UI features than those depicted.

Figure 9:
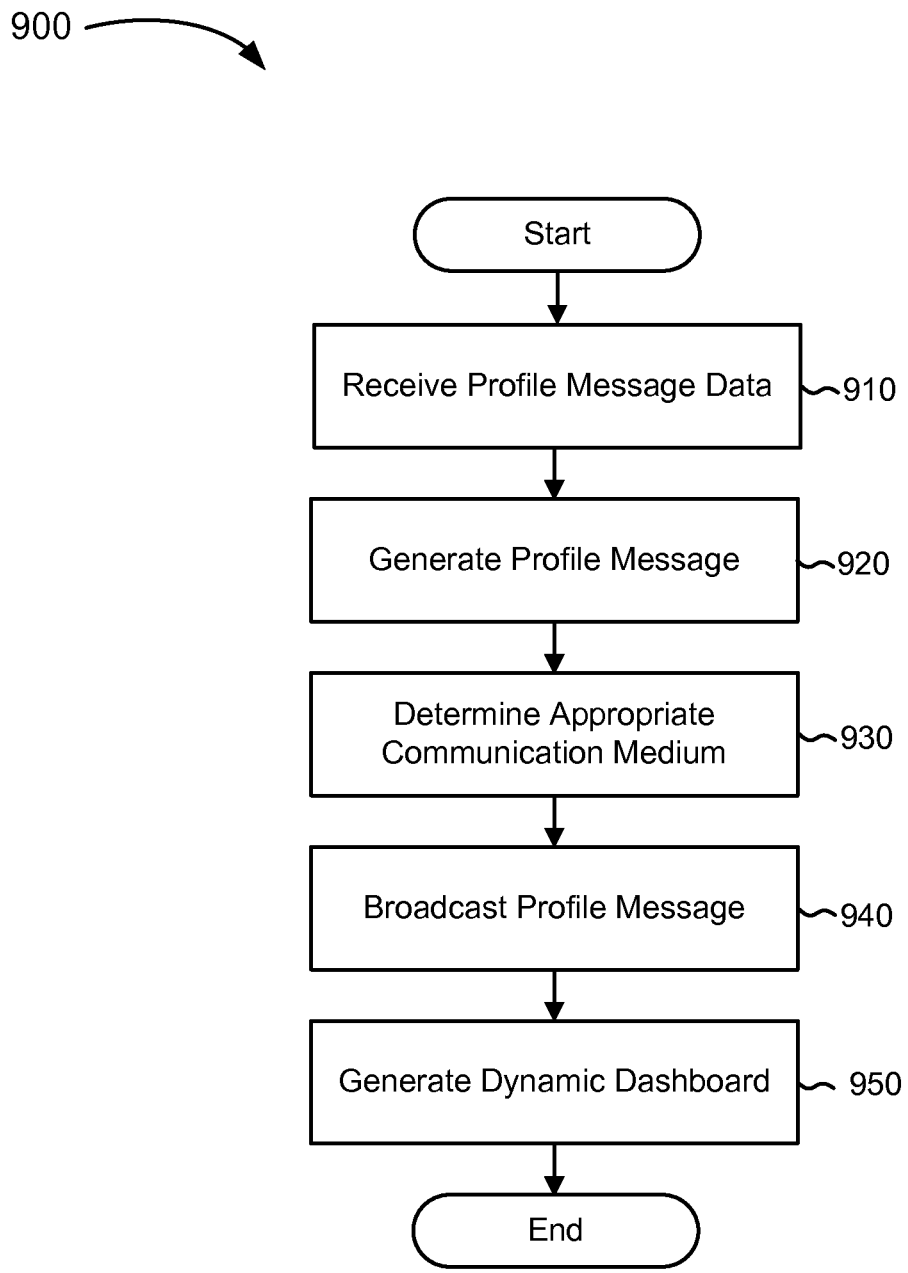
FIG. 9 is a flowchart diagram of an example process for broadcasting a profile message.

FIG. 9 is a flowchart of an example process 900 for broadcasting a profile message. As depicted, process 900 includes receiving 910 profile message data, generating 920 a profile message, determining 930 an appropriate communication medium, broadcasting 940 a profile message and generating 950 a dynamic dashboard. In certain implementations, process 900 may be performed by one or more components of user device 210, such as processing unit 310. However, in other implementations, process 900 may be performed by the components of one or more other devices, including or excluding user device 210. Process 900 will be described with corresponding references to example user interfaces illustrated in FIGS. 10A-10B.

Receiving 910 profile message data may include presenting a user interface (UI) to enable a user to input profile message data. Profile message data may include a message type, target profile data, message content data and geographic data. Similar to one or more of the UIs discussed above, a UI for receiving 910 profile message data may implement a variety of user interface technologies, including a graphical UI (GUI), an audio UI or a combination thereof. Additionally, or alternatively, receiving 910 profile message data may include receiving or retrieving data from sources other than the user. For example, receiving 910 profile message data may include communicating with a telecommunications network, global satellite network or other network to acquire geographic data corresponding to a current geographic location. In another example, receiving 910 profile message data may include retrieving locally stored data, such as a name, telephone number, user device ID or other information. Generating 920 a profile message may include creating a message utilizing at least some profile message data.

Figures 10A, 10B:
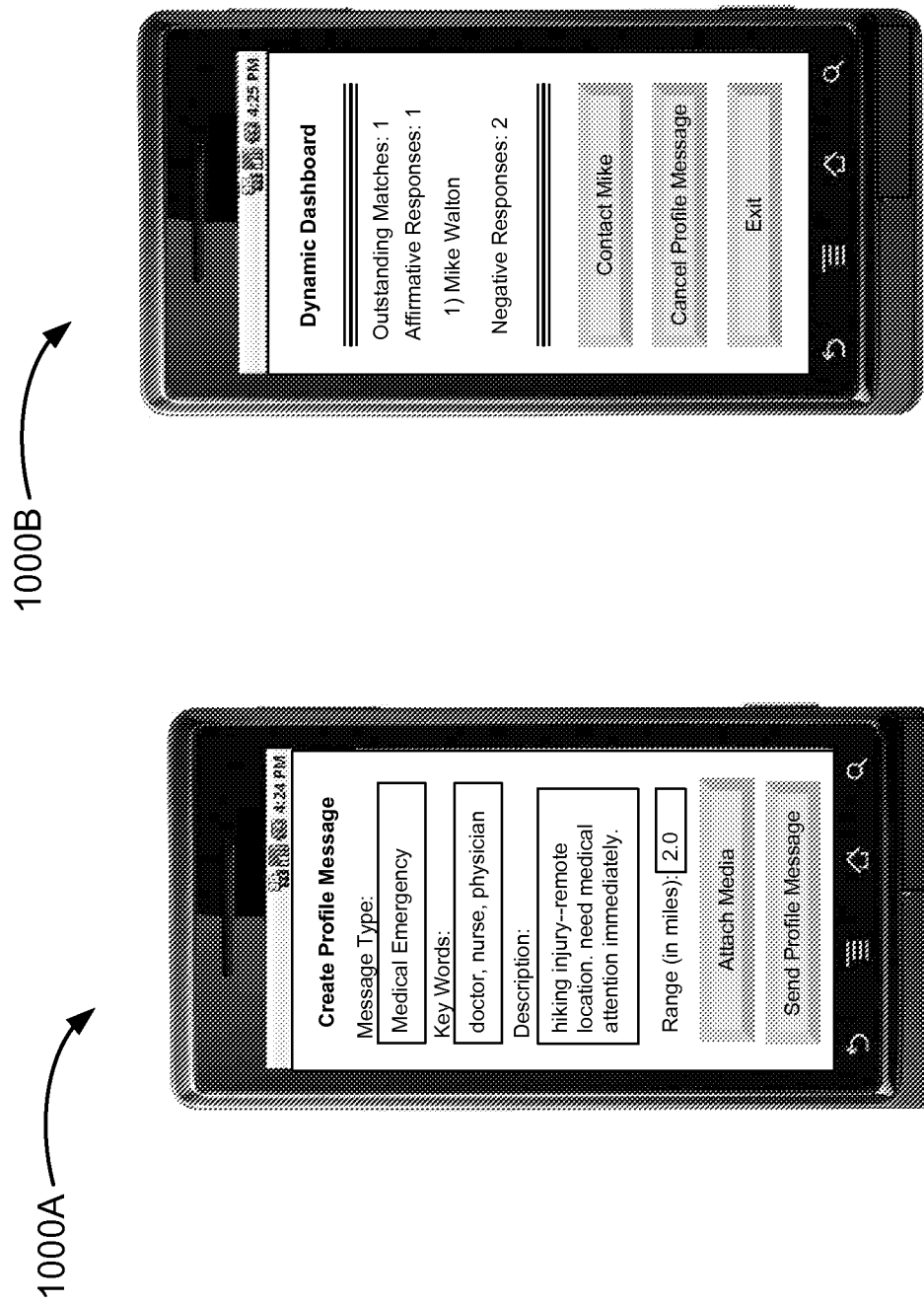
FIGS. 10A-10B are diagrams of example user interfaces for receiving profile message data and a dynamic dashboard.

FIG. 10A illustrates an example of a UI 1000A for receiving profile message data. UI 1000A includes four text boxes that can enable a user to input profile message data. Each text box corresponds to a text box label, such as "Message Type," "Key Words," "Description" and "Range" that indicates the type of information that should be entered into each text box. UI 1000A also includes an Attach Media button and a Send Profile Message button, the functions of which are apparent and need not be discussed in detail. In certain implementations, data inputted into the Key Words text box may correspond to target profile data, and data inputted into the Description text box may correspond to messages data, as discussed herein. Also, data inputted into the Range text box may correspond to geographic data used to specify a broadcast distance for a profile message. In certain implementations, UI 1000A may also include a dropdown menu for specifying a message type (e.g., emergency, warning, declaration, commercial, non-commercial, etc.). While FIG. 10A shows a particular number and arrangement of UI features, in alternative implementations, UI 1000A may include additional, fewer, different or differently arranged UI features than those depicted.

Returning again to FIG. 9, determining 930 an appropriate communication medium may include accessing a prioritized list of communication networks, identifying currently available communication networks and selecting a communication network with the highest priority. For example, a user device 210 located in a particular area may have the option of broadcasting a profile message via several different networks, including a telecommunications network, a satellite network, a user device relay network and/or a wireless LAN. In order to determine which communication network to use, the user device 210 may access a prioritized list of communication networks that identifies, for example, the telecommunications network as being preferred over the other available networks. As such, the user device 210 may proceed by broadcasting 940 the profile message using the telecommunications network.

Generating 950 a dynamic dashboard may include monitoring or tracking a profile message and producing a GUI that displays real-time statistics regarding a profile message. For instance, a dynamic dashboard may include the quantity of user devices that have received the profile message, the quantity of user devices with profiles that match the profile message, the quantity of user devices that have responded affirmatively and/or negatively to the profile message, and the quantity of outstanding profile matches (i.e., user devices with profiles matching the profile message but have not yet responded). In certain implementations, generating 950 a dynamic dashboard may include options for contacting one or more of the user devices with profile matching the profile message. Additionally, or alternatively, generating 950 a dynamic dashboard may include corresponding with, for example, a profile message server 230 configured to maintain real-time data regarding user devices, profile messages and responses to profile messages.

FIG. 10B illustrates an example of a UI 1000B of a dynamic dashboard. UI 1000B includes a summary of matches and responses corresponding to a broadcasted 940 profile message. More particularly, UI 1000B includes the number of outstanding matches, the number of affirmative responses and the number of negative responses. An outstanding match may correspond to matching profiles that have not yet responded to the profile message. An affirmative response may correspond to matching profiles that have responded to the profile message (e.g., by accepting an invitation, sending a text message, initiating a telephone call, etc.). A negative response may correspond to matching profiles that received the profile message but have decided to ignore or otherwise disregard the profile message. UI 1000B also includes a Contact Mike button, (since Mike Walton responded affirmatively), a Cancel Profile Message button and an Exit button, the functions of which are apparent and need not be discussed in detail. While FIG. 10B shows a particular number and arrangement of UI features, in alternative implementations, UI 1000B may include additional, fewer, different or differently arranged UI features than those depicted. For instance, UI 1000B may also include an option for viewing profile information of Mike Walton.

Figure 11:
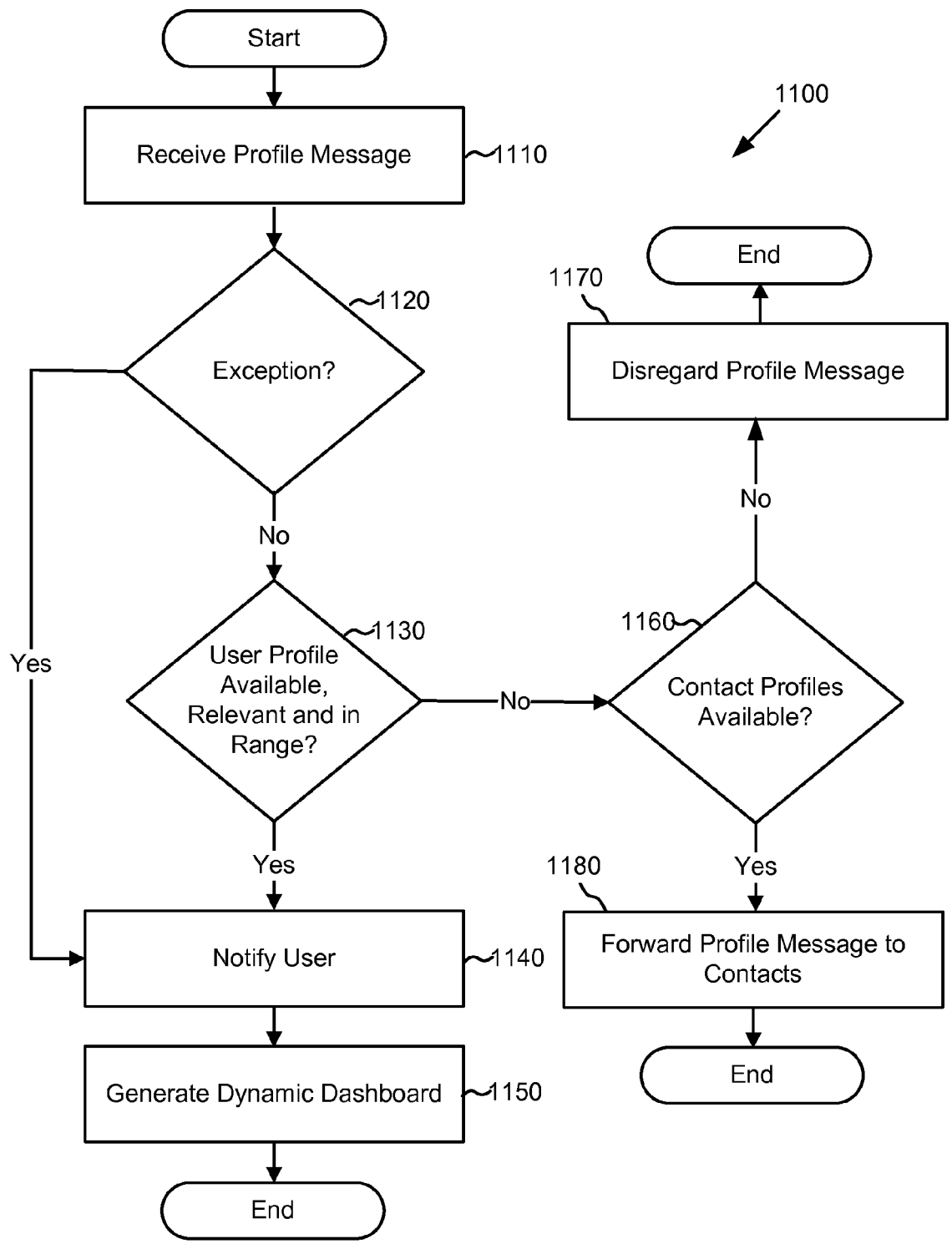
FIG. 11 is a flowchart diagram of an example process for responding to a profile message.

FIG. 11 is a flowchart diagram of an example process 1100 for responding to a profile message. The depicted process 1100 includes receiving 1110 a profile message, determining 1120 whether the profile message corresponds to an exception, determining 1130 whether the user profile is available, relevant and in range, notifying 1140 a user, and generating 1150 a dynamic dashboard. Process 1100 also includes determining 1160 whether contact profiles are available, forwarding 1180 the profile message to contacts and disregarding 1170 the profile message. In certain implementations, process 1100 may be performed by one or more components of user device 210, such as processing unit 310. However, in other implementations, process 1100 may be performed by the components of one or more other devices, including or excluding user device 210. Process 1100 will be described with corresponding references to example user interfaces illustrated in FIGS. 12A-12E.

Process 1100 may begin by receiving 1110 a profile message. As discussed above, a profile message may be comprised of, for example, an originator, a message type, key words, message content data, geographic data, or other types of data. Upon receiving 1110 the profile message, process 1100 may proceed by determining 1120 whether the profile message qualifies for an exception. In certain implementations, whether a profile message qualifies for an exception may depend on one or more of a variety of factors and conditions. For instance, a profile message may qualify for an exception if the profile message is an emergency message or a warning message, which may, for example, be specified by the message type of the profile message. Other exceptions may be based on a broadcast source, a broadcast time, a reception time, message content, or other characteristics of the profile message. If the profile message qualifies as an exception (1120—Yes), a user may be notified 1140 regarding the profile message (which is discussed in greater detail below).

However, if the profile message does not qualify as an exception (1120—No), then process 1100 may proceed by determining 1130 whether a user profile is available, relevant and in range. Whether a user profile is available may depend on, for example, user profile availability data previously received from a user (see, for example, FIG. 7, block 730). Whether the profile message is relevant (e.g., matches or is sufficiently relevant) to the user profile may depend on a variety of factors. In some implementations, determining 1130 whether the profile message is relevant may include a comparison of the target profile data of the profile message and key words of the user profile. Additionally, or alternatively, determining 1130 whether the profile message is relevant may include a comparison of several portions of the profile message (e.g., the target profile data, the message data, the geographic data, etc.) to several portions of the user profile (e.g., name, profession, skills, key words, interests etc.).

For example, if the profile message data of the profile message references a doctor as the target profile data and the user profile data includes the word "doctor" or "medical doctor" in a profession field or a key word field of the user profile, then process 1100 may conclude that the profile message matches, is relevant, or at least sufficiently relevant, to the user profile in question. In some implementations, determining 1130 whether a profile message is relevant to a user profile may include processes in addition to and/or more sophisticated than the comparisons just described. For instance, some implementations of process 1100 may evaluate synonyms, acronyms, alternative spellings, potential equivalents and different languages when determining whether a profile message is relevant to a user profile.

Additionally, or alternatively, process 1100 may apply a more flexible degree of relevancy depending on various factors, such as the apparent importance of a particular profile message. For example, if the profile message includes the terms "injured," "emergency" or "doctor," process 1100 may broaden the scope of the term "doctor" to include "physician," "nurse," "EMT" (Emergency Medical Technician) and "medical professional" (an increased level of flexibility may apply to the "in Range" requirement discussed below).

Similar to determining whether a user profile is relevant to a profile message, determining whether a user profile is in range, may also include a variety of factors and conditions. For instance, making this determination may include ascertaining the current location of the user device broadcasting the profile message, the user-specified broadcast distance for the profile message, and the current location of the user device receiving the profile message. In some implementations, the current location of the user device broadcasting the profile message and the user-specified broadcast distance may be ascertained by accessing the geographic data included in the profile message. The current location of the user device receiving the profile message may be determined by communicating with one or more networks 220 (e.g., a telecommunications network, a satellite network, a relay network and/or a LAN).

Upon acquiring the foregoing data, the distance between the user devices may be compared to the user-specified distance to determine 1130 whether the user profile is in range (i.e., whether the user device receiving the profile message is within the broadcast range specified by the user broadcasting the profile message). While determining 1130 whether the user profile is in range may be accomplished in the manner described above, it should be appreciated that alternative ways of doing so are possible and may involve fewer, additional, or alternative operations.

If the user profile is available, relevant, and in range (1130—Yes), then process 1100 may proceed by notifying 1140 a user of the profile message. Notifying 1140 the user of the profile message may be done in a variety of ways. For instance, notifying 1140 the user may include generating one or more sounds, vibrations, textual message, graphics, or any combination thereof. Additionally, or alternatively, notifying the user may include automatically sending an e-mail message, instant message, text message or initiating a telephone call. In certain implementations, notifying 1140 the user may include providing the user with an opportunity to accept or decline the profile message (which may also be done via the dynamic dashboard).

Figure 12B:
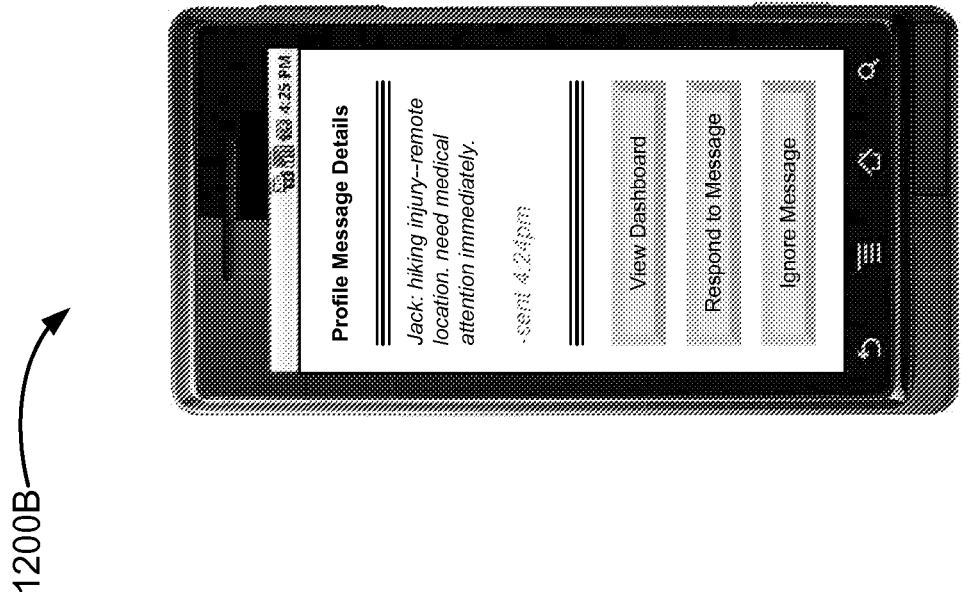
FIGS. 12A-12E are diagrams of example user interfaces for receiving and responding to a profile message.
Figure 12A:
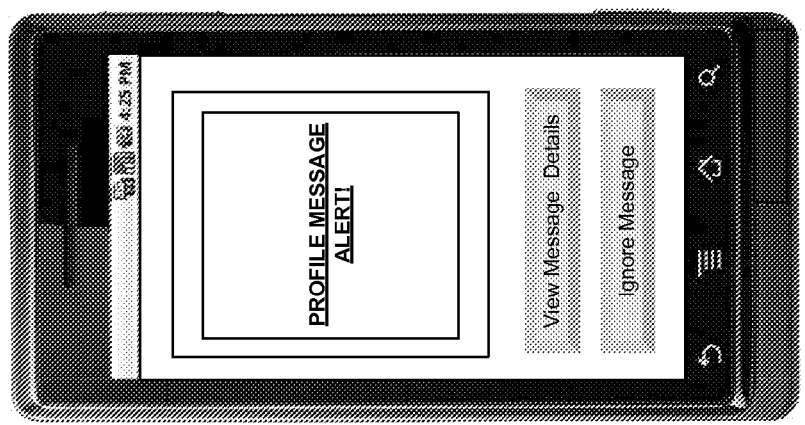

FIG. 12A illustrates an example UI 1200A notifying a user of a profile message. In this example, the user notification includes the phrase "PROFILE MESSAGE ALERT!" in a relatively large, boarded area of the UI. The UI also includes a View Message Details button and an Ignore Message button, the functions of which are apparent and need not be discussed in detail. FIG. 12B illustrates an example UI 1200B displaying the details of a profile message. For instance, UI 1200B includes the message "Jack: hiking injury—remote location. need medical attention immediately. -sent 4:24 pm" In this example, "Jack" is the name of the individual that broadcasted the profile message, and "-sent 4:24 pm," indicates the time that the profile message was broadcasted (or received). In certain implementations, both "Jack" and "-sent 4:24 pm" may have been automatically included in the profile message (see, for example, FIG. 9, blocks 910-920). By contrast, "hiking injury—remote location. need medical attention immediately" may correspond to message content that was manually inputted by the individual broadcasting the profile message (see, for example, FIG. 9, blocks 910-920). UI 1200B also includes a View Dashboard button, a Respond to Message button and an Ignore Message button, the functions of which are apparent and need not be discussed in detail.

Returning to FIG. 11, process 1100 may include generating 1150 a dynamic dashboard. A dynamic dashboard may monitor various aspects of the profile message and actions or events corresponding thereto. For instance, the dynamic dashboard may provide a graphical representation of the quantity of user devices 210 that have received the profile message, the quantity of user devices 210 with profiles that match the profile message, the quantity of user devices 210 that have responded affirmatively, and/or negatively to the profile message and/or the quantity of outstanding profile matches (i.e., user devices that have user profiles matching the profile message but that have not yet responded).

Additionally, or alternatively, the dynamic dashboard may display profile information, location information, and/or other data, regarding the individuals responding to the profile message. In this manner, the dynamic dashboard may better inform a user about how to respond to the profile message. For example, if the dynamic dashboard indicates that multiple users have already responded affirmatively to the profile message, the user may better determine whether the needs or requests of the user originating the profile message have been or will be satisfied. In some implementations, the dynamic dashboard may be based on data received from one or more profile message servers 230 configured to monitor profile messages and provide real-time updates to the user device 210 broadcasting the profile message and the user devices 210 receiving the user-specific messages. Additionally, or alternatively, the dynamic dashboard may be based on data that is passed between user devices 210 directly (e.g., without the assistance of a profile message server 230).

The dynamic dashboard may enable the user to respond to the profile message. In certain implementations, enabling the user to respond to the profile message may include providing options in a GUI for the user to select between initiating a telephone call, sending a voicemail, a text message, an instant message, or attempting to initiate a video conference. Additionally, or alternatively, enabling the user to respond to a profile message may include providing the user with a geographic map indicating the origination location of the profile message and highlighting an appropriate route for traveling to the user that originated the profile message.

Figure 12E:
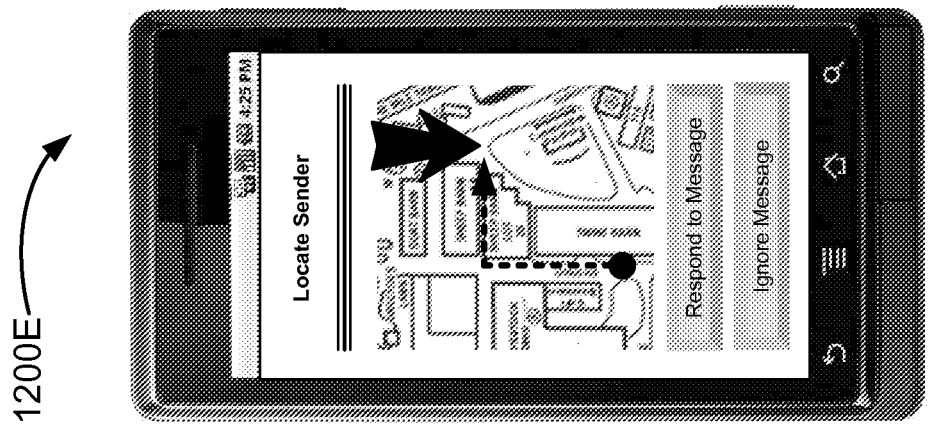
Figure 12D:
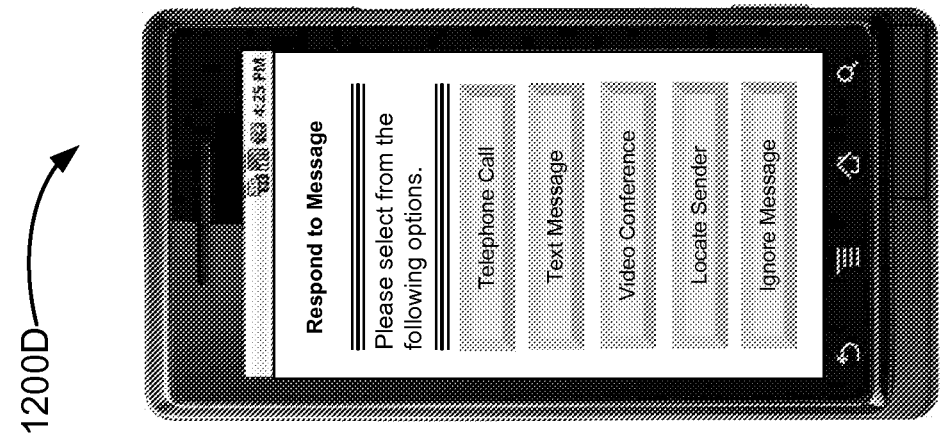
Figure 12C:
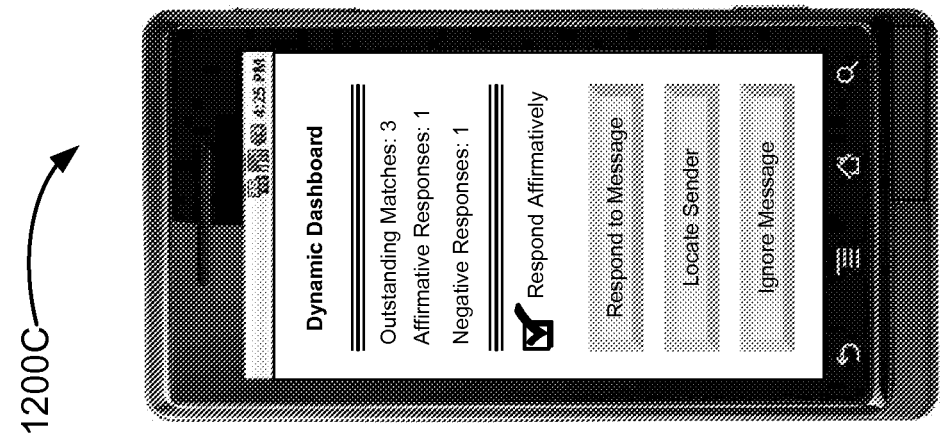

FIG. 12C illustrates an example UI 1200C displaying a dynamic dashboard. As depicted, the dynamic dashboard includes a list that includes the quantity of outstanding matches, the quantity of affirmative responses, and the quantity of negative responses. The dynamic dashboard also includes a check box for affirmatively responding to the corresponding profile message. The dynamic dashboard further includes a Respond to Message button, a Locate Sender button and an Ignore Message button, the functions of which are apparent and need not be discussed in detail.

FIG. 12D is an example UI 1200D displaying several options for responding to a profile message. As depicted, UI 1200D includes a Telephone Call button, a Text Message button, a Video Conference button, a Locate Sender button and an Ignore Message button. As such, UI 1200D provides a user with various ways to immediately respond to a profile message. FIG. 12E is an example UI 1200E displaying a geographic map. The UI 1200E also includes a current location of the user device that received the profile message and an appropriate route for traveling to the current location of the user device that broadcasted the profile message. Similar to other features of the dynamic dashboard, the mapping services described herein may also be updated in real-time. In addition, the UI 1200E also includes a Respond to Message button and an Ignore Message button, the functions of which are apparent and need not be discussed in detail.

Returning to FIG. 11, when process 1100 determines that a user profile is not available, relevant, or in range (1130—No), process 1100 may proceed by determining 1160 whether any contact profiles are available. This may be done in a manner that is similar to determining 1130 whether the user profile is available, as discussed above. If none of the contact profiles are available (1160—No), process 1100 may proceed by disregarding 1170 the profile message. However, if at least one of the contact profiles is available (1160—Yes), then process 1100 may proceed by forwarding 1180 the profile message to the user device of any such contacts. In certain implementations, process 1100 may determine whether any of such contacts satisfy the "in range" requirement discussed above and forwarding 1180 the profile message to those contacts.

Figure 13:
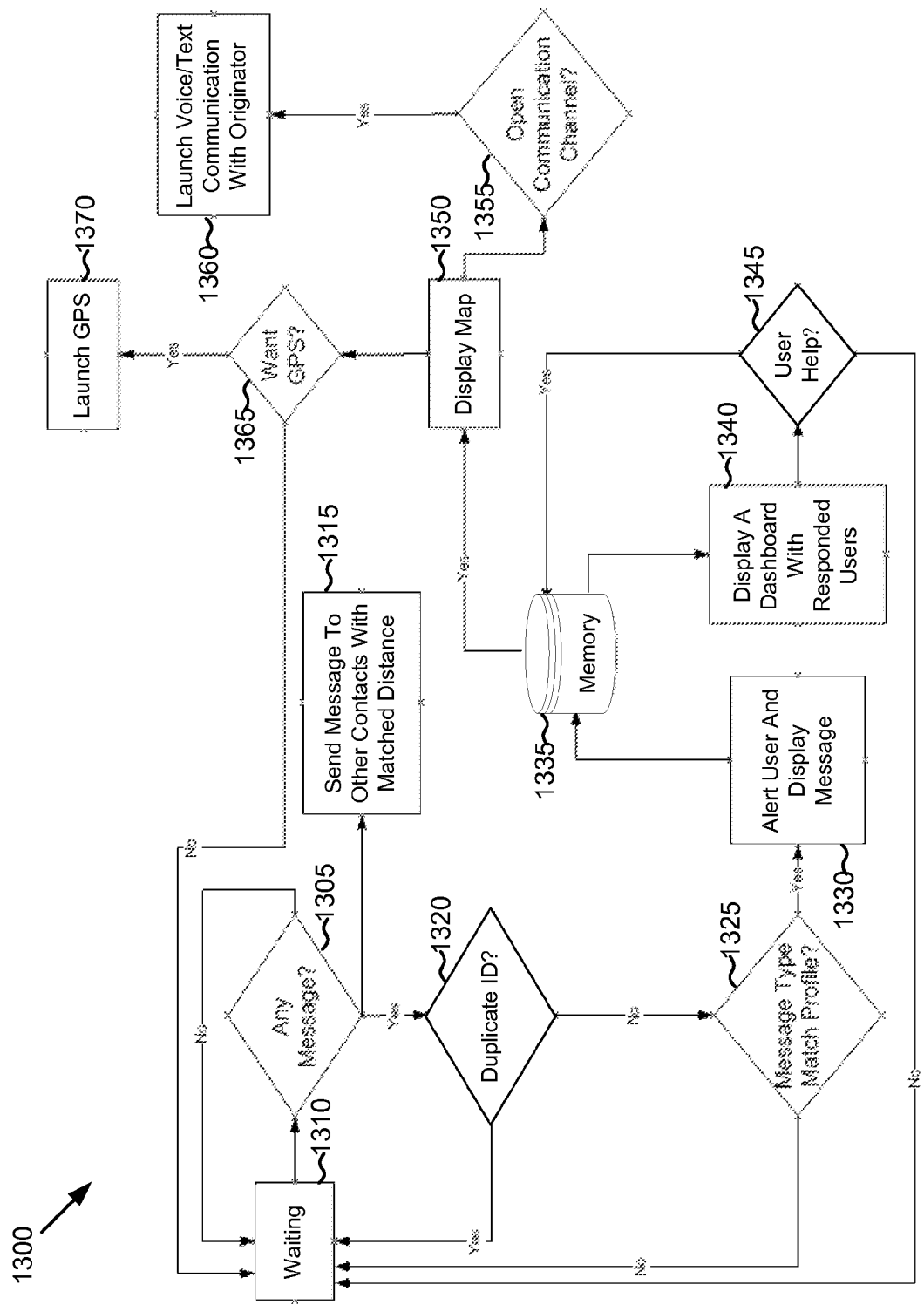
FIG. 13 is a flowchart diagram of another example process for responding to a profile message.

FIG. 13 is a flowchart diagram of another example process 1300 for responding to a profile message. Process 1300 includes numerous operations that are each discussed in detail below. It should be noted, however, that process 1300 may be performed by one or more components of user device 210, such as processing unit 310. Alternatively, process 1300 may be performed by the components of one or more other devices, including or excluding use device 210.

Process 1300 may begin by determining 1305 whether a profile message has been received. If no profile message has been received (1305—No), process 1300 may wait 1310 until a profile message is received. When a profile message has been received (1305—Yes), process 1300 may proceed by determining 1320 whether the profile message was already received. This may be done by, for example, comparing an ID of the profile message to one or more identities of recently received profile messages. If the profile message has already been received (1320—Yes), then process 1300 may proceed by waiting 1310 for another profile message to be received. Process 1300 may also send 1315 the profile message to one or more contacts with matched distances.

If the profile message has not already been received (1320—No), then process 1300 may proceed by determining 1325 whether the profile message matches (e.g., is sufficiently relevant to) a user profile. If profile message does not match the user profile (1325—No), then process 1300 may proceed by waiting 1310 for another profile message to be received. Alternatively, if the profile message is sufficiently relevant to the user profile (1325—Yes), then process 1300 may continue by alerting 1330 a user and displaying the profile message, which may be recorded in a memory 1335. In certain implementations that include a profile message server 230, memory 1335 may represent a storage device 550 or other component of the profile message server 230. Additionally, or alternatively, memory 1335 may represent a memory 320 or other component of a user device 210.

Process 1300 may continue by displaying 1340 a dashboard with responded users and enabling 1345 the user to respond affirmatively or negatively to the profile message (e.g., accept or decline an invitation to offer aid). If the user responds negatively (1345—No), process 1300 may wait 1310 for another profile message to be received. However, if the user responds affirmatively (1345—Yes), process 1300 may update memory 1335 with the user's affirmative response. In certain implementations, process 1300 may also update the memory 1335 when the user responds negatively.

Process 1300 may include displaying 1350 a map. Process 1300 may provide a user with the option of opening 1355 a communication channel and launching 1360 a voice/text communication with the with the user device that originated the profile message. Process 1300 may provide the user with the option of obtaining 1365 Global Positioning System (GPS) services. If the user declines (1365—No), then process 1300 may wait 1310 for another profile message to be received. However, if the user accepts GPS services (1365—Yes), process 1300 may launch 1370 GPS services, which may include modifying the map (1350) with an appropriate route for traveling to the geographic location where the profile message originated.

Figure 14:
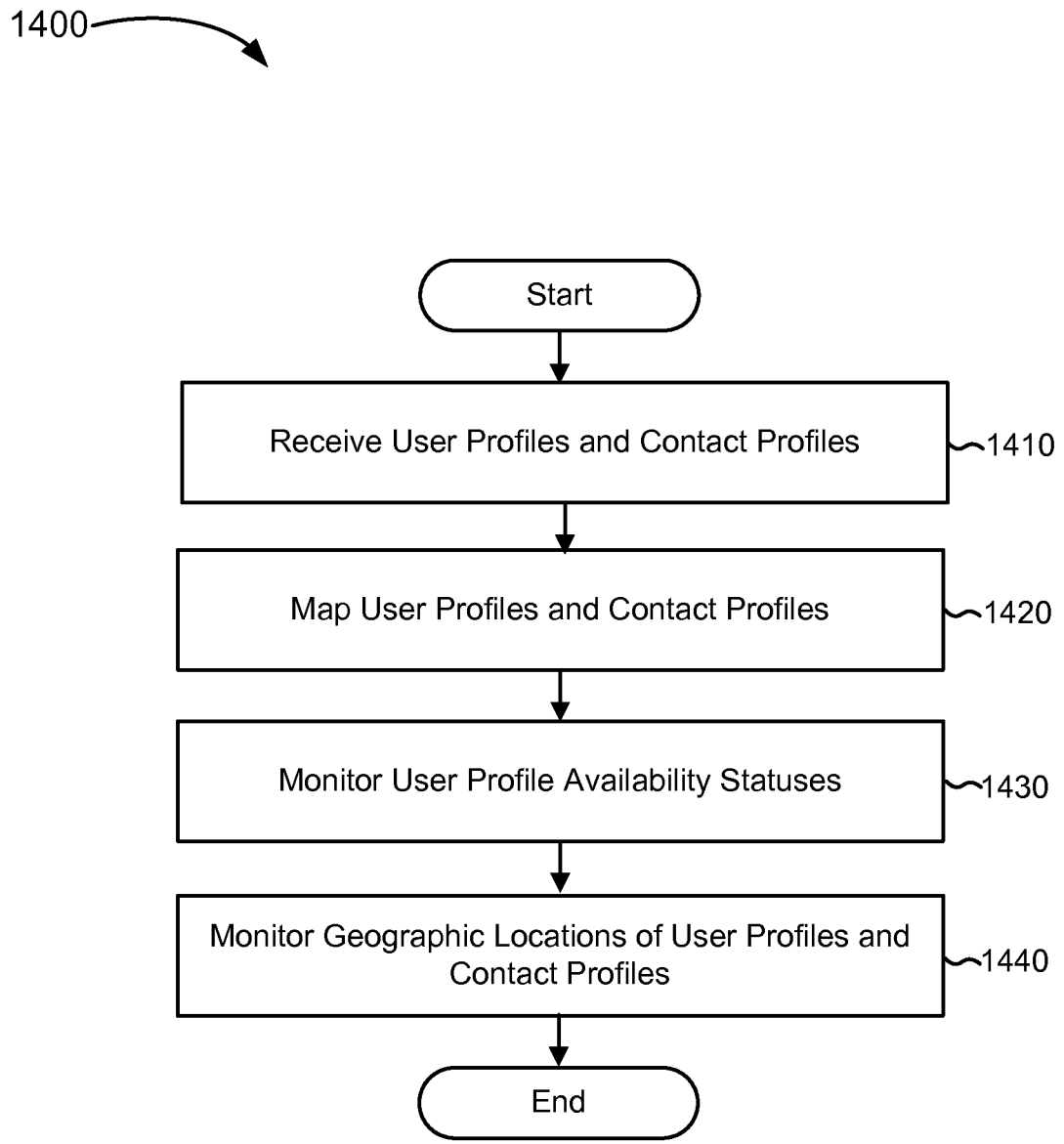
FIG. 14 is a flowchart diagram of an example process for managing user devices.

FIG. 14 is a flowchart diagram of an example process 1400 for managing user devices. The depicted process 1400 may include receiving 1410 user profiles and contact profiles, mapping 1420 the user profiles and contact profiles, monitoring 1430 user profile availability statuses, and monitoring 1440 geographic locations of user profiles and contact profiles. Process 1400 may be performed by one or more components of profile message server 230, such as processor 520. Alternatively, process 1400 may be performed by the components of one or more other devices, including or excluding profile message server 230.

Process 1400 may begin by receiving user profiles and contact profiles. In certain implementations, this may include a profile message server 230 receiving a user profile and contact profiles from one or more user devices 210. Receiving 1410 user profiles and contact profiles may include storing the user profiles and contact profiles. As mentioned above, a user profile and a contact profile may each include data. Process 1400 may continue by mapping 1420 user profiles and contact profiles. In certain implementations, mapping 1420 user profiles and contact profiles may include populating a memory, which may include a relational database, with proper associations between the user profiles and the contact profiles.

Process 1400 may include monitoring 1430 user profile availability statuses. In some implementations, this may include receiving updates from user devices whenever a new user profile or contact profile is created or updated and updating a local memory or storage device accordingly. Process 1400 may include monitoring 1440 geographic locations of user profiles and contact profiles. In certain implementations, this may be done for one or more user profiles or contact profiles, continuously, periodically or in response to a specific event, such as receiving a profile message from a user device.

Figure 15:
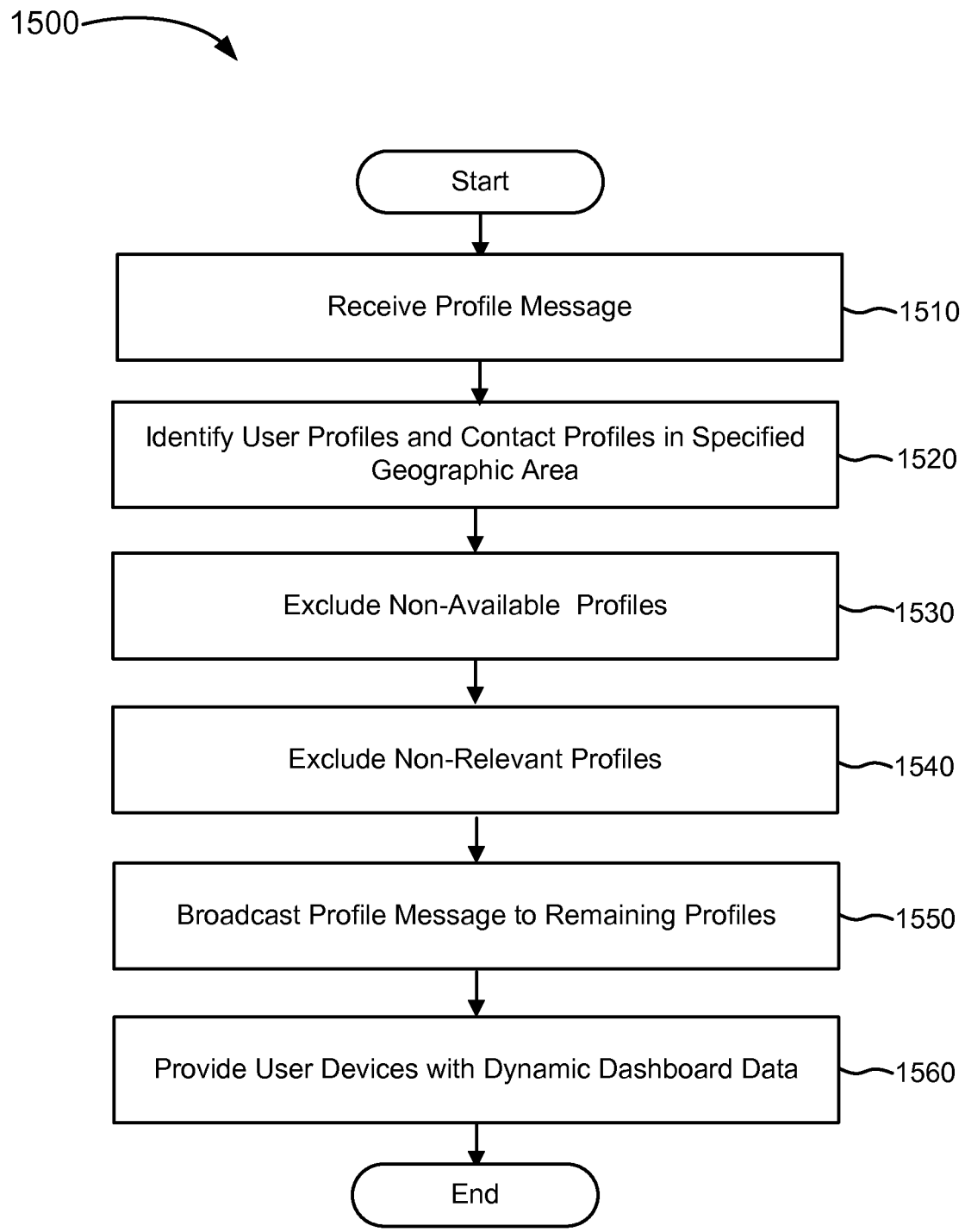
FIG. 15 is a flowchart diagram of an example process for managing profile message communications.

FIG. 15 is a flowchart diagram of an example process 1500 for managing profile message communications. The depicted process 1500 may include receiving 1510 profile messages, identifying 1520 user profiles and contact profiles in a specified geographic area, excluding 1530 non-available profiles, excluding 1540 non-relevant profiles, broadcasting 1550 profile messages to the remaining profiles and providing 1560 user devices with dynamic dashboard data. Process 1500 may be performed by one or more components of profile message server 230, such as processor 520. Alternatively, process 1500 may be performed by the components of one or more other devices, including or excluding profile message server 230.

Process 1500 may include receiving a profile message. In some implementations, the profile message may be received from a user device 210. As discussed above, a profile message may include profile message data, such as originator data, a message type, target profile data, message content data and/or geographic data.

Process 1500 may include identifying user profiles and contact profiles in a specified geographic area. In some implementations, process 1500 may accomplish this based on the geographic data contained in the profile message. Additionally, or alternatively, identifying 1520 user profiles and contact profiles in a specified area may include generating a list of the user profiles and contact profiles that can be used in subsequent process 1500 operations. For example, process 1500 may include excluding 1530 non-available profiles and excluding 1540 non-relevant profiles from the list of user profiles and contact profiles. Process 1500 may broadcast profiles messages to any user profiles or contact profiles in the list and providing 1550 user devices 210 corresponding to said user profiles and contact profiles with dynamic dashboard data, thereby enabling the user devices 210 with the dynamic dashboard data features and operations described herein.

Figure 16:
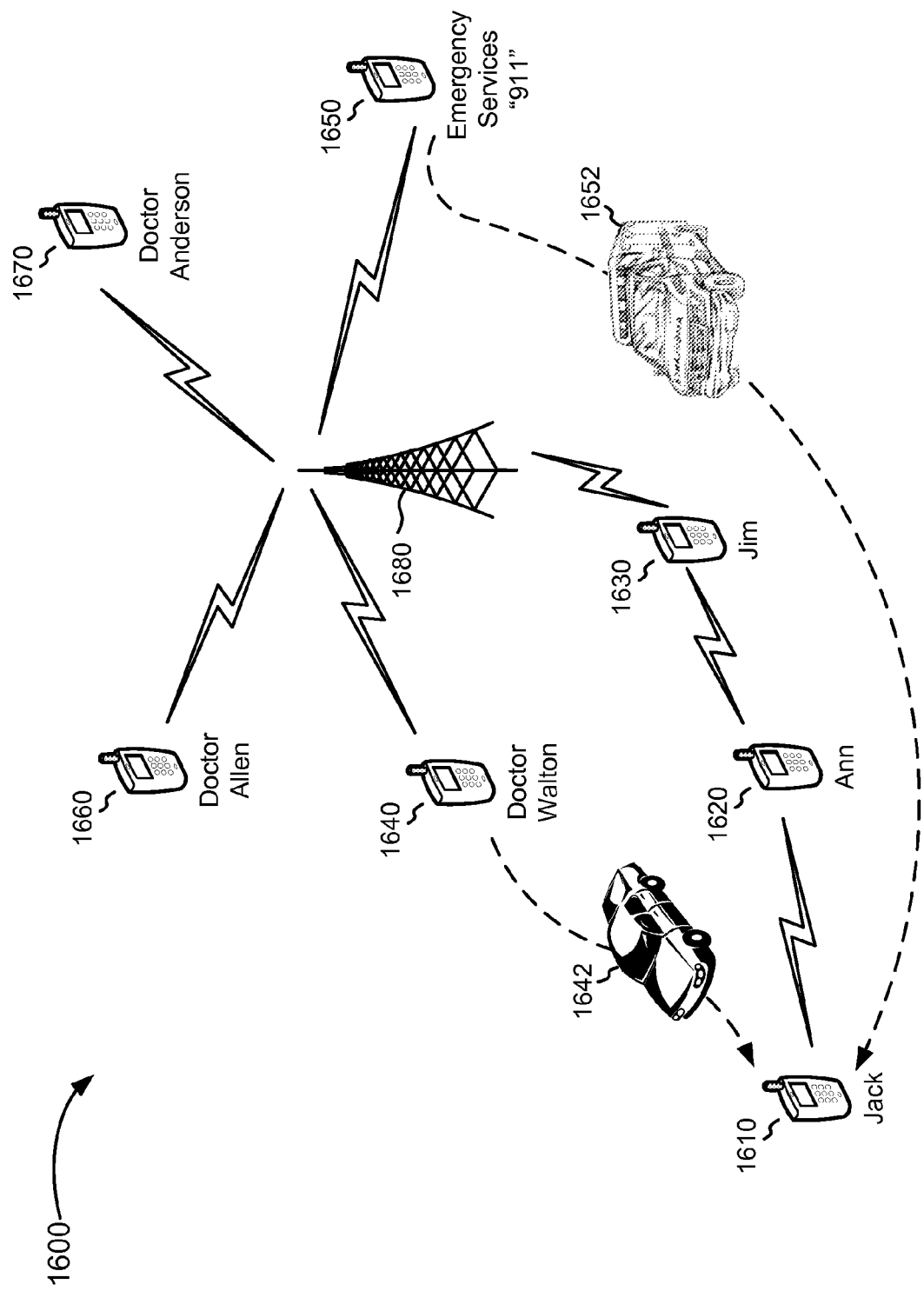
FIGS. 16-20 are diagrams that illustrate example implementations of systems and/or methods described herein.

FIG. 16 is a diagram that illustrates an example implementation 1600 of systems and/or methods described herein. As depicted, implementation 1600 may include several user devices 1610-1670 (also referred to as Jack 1610, Ann 1620, Jim 1630, Doctor Walton 1640, Emergency Services 1650, Doctor Allen 1660 and Doctor Anderson 1670), a telecommunications network 1680, Doctor Walton's vehicle 1642 and an ambulance 1652. In certain implementations, each of the user devices 1610-1670 may correspond to user device 210, and telecommunications network 1680 may correspond to network 220.

While hiking in a remote area, Jack 1610 has become ill and is in need of immediate medical attention. Jack 1610 tries calling for emergency services (e.g., "911"), but is unable to get cellular reception because of his location. As such, Jack 1610 broadcasts a profile message hoping to get help. Jack 1610 assigns an Emergency (Help Seeking) message type to the profile message, includes an audio recording and text message, as the message content, and specifies a broadcast range of 5 miles. Additional information, such as Jack's name and current geographic location, is automatically included in the profile message, which is shortly thereafter broadcasted 5 miles as specified by Jack 1610.

Despite the broadcast range, the profile message does not reach the telecommunications network 1680. However, the profile message does reach Ann 1620, a fellow hiker in the area. While Ann 1620 is closer to a telecommunications network 1680 than Jack 1610, Ann 1620 is still too far away to get any service from the telecommunications network 1680. As such, Ann's user device 1620 relays the profile message to Jim 1630, and Jim 1630 communicates the profile message to the telecommunications network 1680.

The telecommunications network 1680 then broadcasts Jack's profile message, which is received by, and matches the profiles of, Doctor Walton 1640, Emergency Services 1650, Doctor Allen 1660 and Doctor Anderson 1670. Upon receiving Jack's profile message, Doctor Walton 1640 immediately accepts Jack's request for aid, obtains Jack's current geographic location, travels 1642 to Jack's location and administers the necessary medical care. By accessing a dynamic dashboard, Doctors Allen 1660 and Anderson 1670 can see that Doctor Walton 1640 has already responded to Jack's request for aid and, therefore, see there is no need to take additional action. Eventually, Jack's message reaches emergency services 1650 and an ambulance 1652 comes and takes Jack to a nearby hospital.

Figure 17:
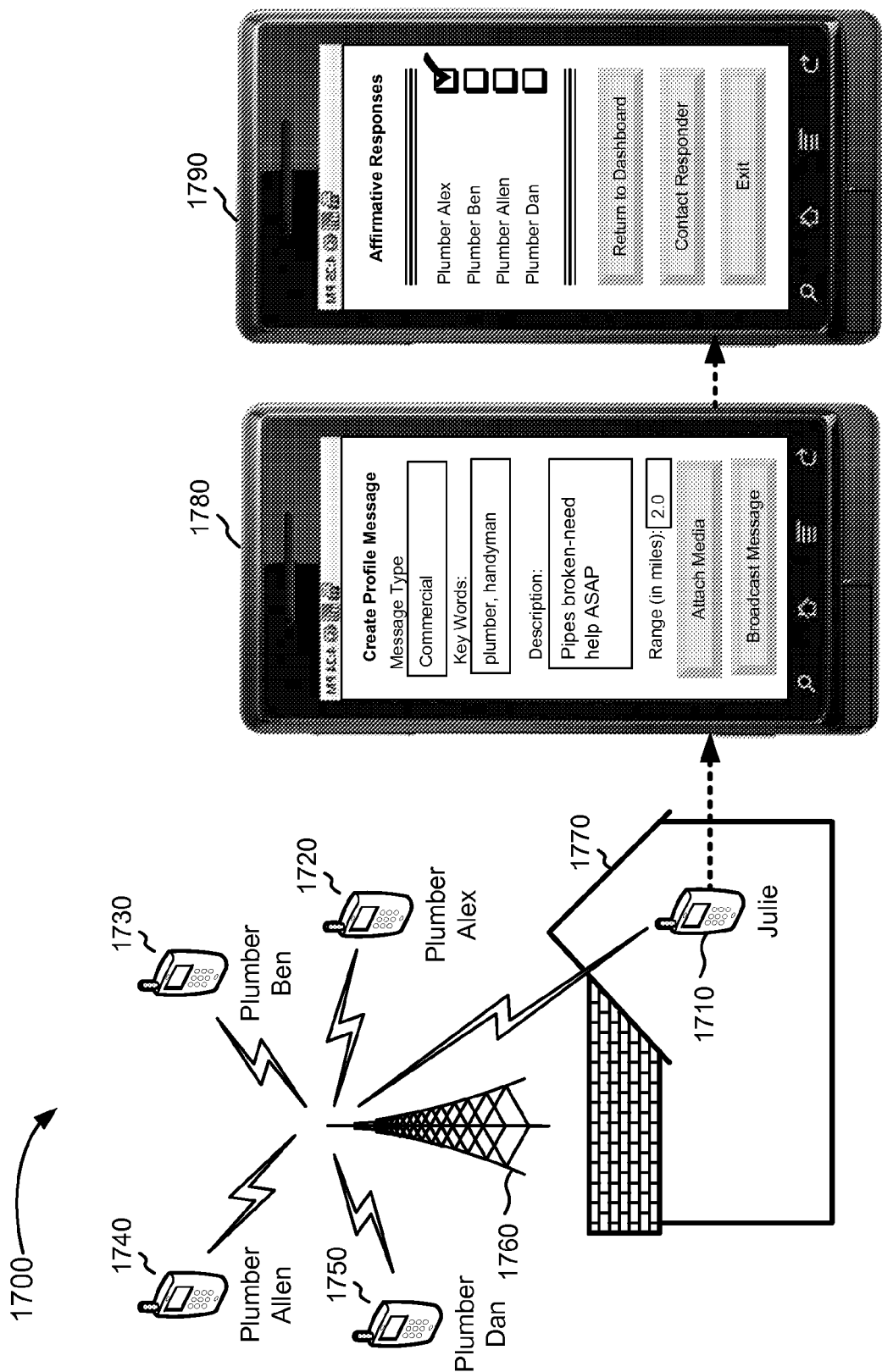

FIG. 17 is a diagram that illustrates an example implementation 1700 of systems and/or methods described herein. As depicted, implementation 1700 includes user devices 1710-1750 (also referred to as Julie 1710, Plumber Alex 1720, Plumber Ben 1730, Plumber Allen 1740 and Plumber Dan 1750), a telecommunications network 1760 and Julie's home 1770. The implementation 1700 also includes an example UI for creating profile messages 1780 and an example UI for accepting responses 1790, which correspond to user device 1710. In certain implementations, each of the user devices 1710-1750 may correspond to user device 210, and telecommunications network 1760 may correspond to network 220.

With the pipes in her house 1770 leaking water, Julie 1710 has decided to broadcast a profile message in an attempt to quickly obtain plumbing services from nearby plumbers. As illustrated in UI 1780, Julie enters the words "plumber" and "handyman" as key words and types "Pipes broken-need help ASAP" as her description. She also enters 2 miles as her broadcast range since she needs help quickly. If Julie 1710 wanted, she could also include an audio message, a photo, or a video via the Attach Media button in UI 1780.

After inputting the necessary data, Julie 1710 then selects the Broadcast Message button of UI 1780, and her profile message is broadcasted to Plumber Alex 1720, Plumber Ben 1730, Plumber Allen 1740 and Plumber Dan 1750 via telecommunications network 1760. Shortly thereafter, Plumber Alex 1720, Plumber Ben 1730, Plumber Allen 1740 and Plumber Dan 1750 each responds affirmatively to Julie's 1710 profile message. As illustrated in UI 1790, each of the plumbers' affirmative responses is listed for Julie 1710 to consider. To help her decide, Julie 1710 contacts each plumber, starting with Plumber Alex, by marking the box appropriate check box and pressing the Contact Responder button of UI 1790.

Figure 18:
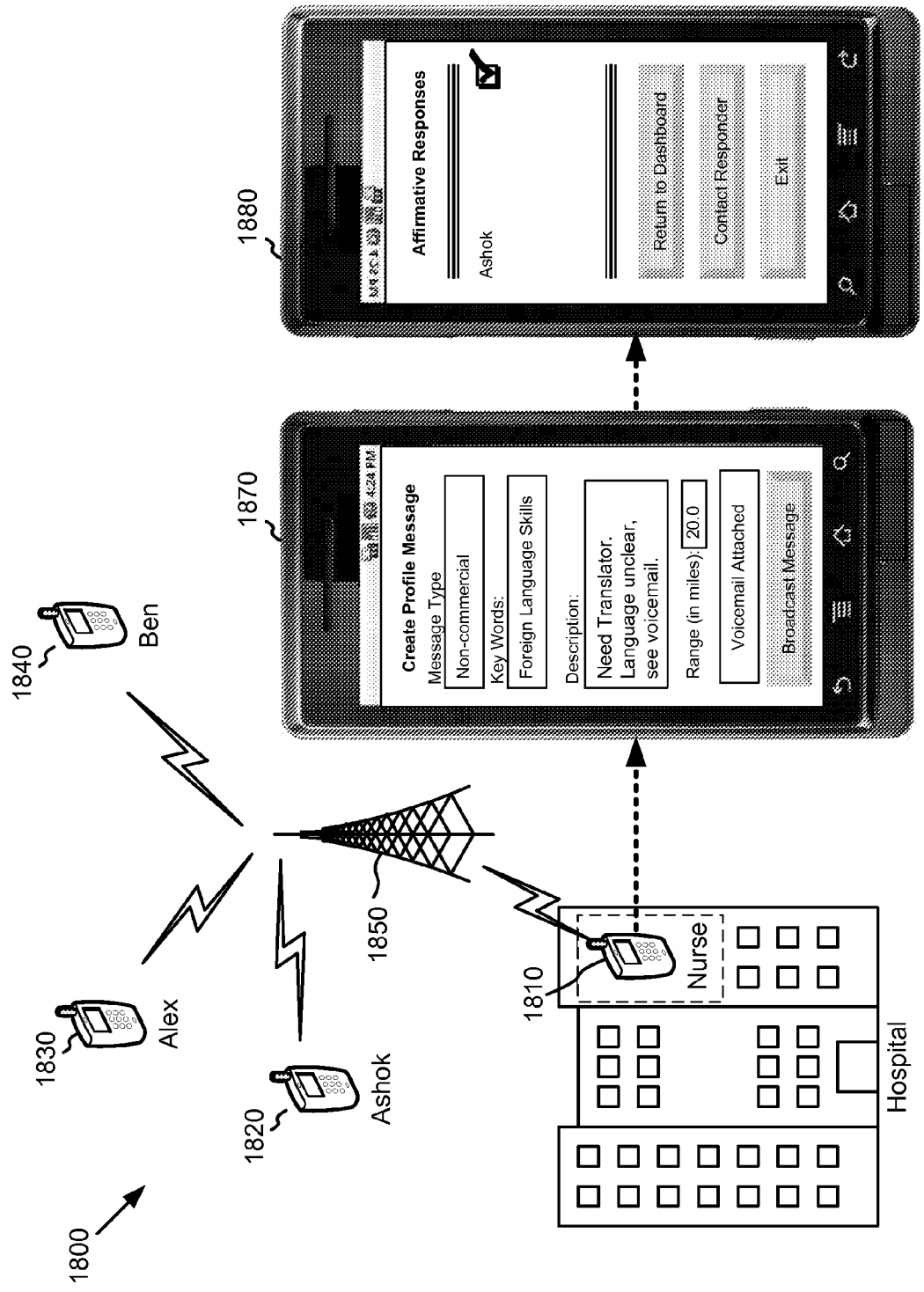

FIG. 18 is a diagram that illustrates an example implementation 1800 of systems and/or methods described herein. As depicted, implementation 1800 includes user devices 1810-1840 (also referred to as Nurse 1810, Ashok 1820, Alex 1830, and Ben 1840) and a telecommunications network 1850. The implementation 1800 also includes example UI 1870 for creating profile messages and example UI 1880 for accepting responses, which correspond to Nurse 1810. In certain implementations, each of the user devices 1810-1840 may correspond to user device 210, and telecommunications network 1850 may correspond to network 220.

A newly admitted hospital patient speaks a foreign language that none of the doctors, nurses or staff can recognize. Nurse 1810, therefore, decides to broadcast a profile message in an attempt to quickly locate a translator. As illustrated in UI 1870, Nurse 1810 inputs the key words "Foreign Language Skills," and the description "Need Translator. Language unclear, see voicemail." Since the translation services that Nurse 1810 is seeking could take place over the telephone, Nurse 1810 enters a relatively large broadcast range of 20 miles to increase the chance of finding an appropriate translator. Additionally, since Nurse 1810 does not know what language the newly admitted patient is speaking, Nurse 1810 makes a recording of the patient's voice and attaches the recording to the profile message. Nurse 1810 then presses the Broadcast Message button, causing the profile message to be broadcasted via telecommunications network 1850 to user devices 1820-1840 with matching profiles (Ashok 1820, Alex 1830 and Ben 1840).

One of the users, Ashok, is fluent in the foreign language and able to act as a translator. Therefore, Ashok responds affirmatively to the profile message. As illustrated in UI 1880, Nurse 1810 receives the response from Ashok 1820 and lists Ashok 1820 as an affirmative responder to the recently broadcasted profile message. Nurse 1810 may then mark the box corresponding to Ashok in UI 1880 and press the Contact Responder button to initiate a telephone call, video conference, etc.

Figure 19:
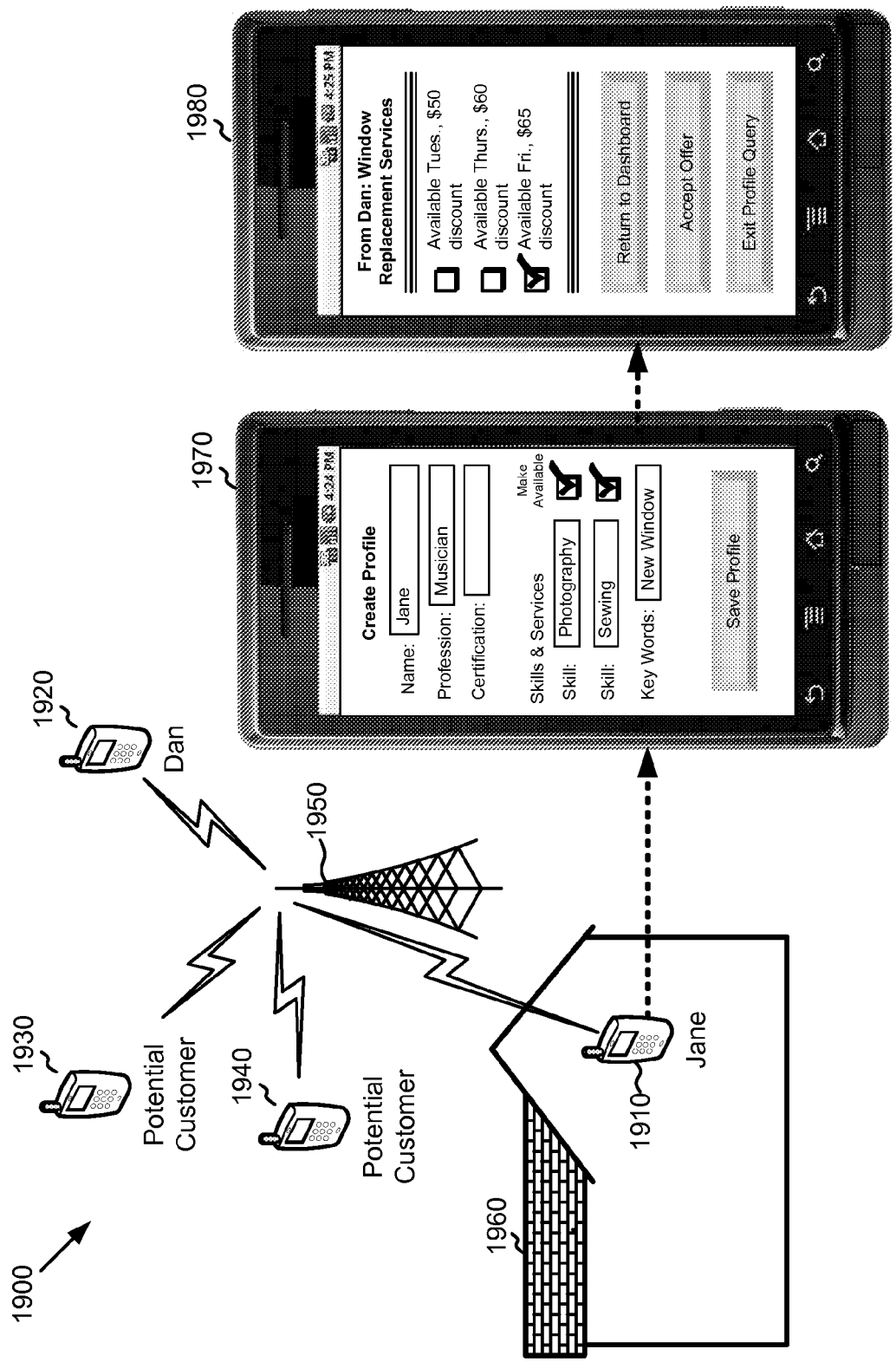

FIG. 19 is a diagram that illustrates an example implementation 1900 of systems and/or methods described herein. As depicted, implementation 1900 includes user devices 1910-1940 (also referred to as Jane 1910, Dan 1920 and potential customers 1930-1940), a telecommunications network 1950, and a home 1960. Implementation 1900 also includes an example UI 1970 for creating a user profile and an example UI 1980 for accepting offers, which corresponds to user device 1910. In certain implementations, each of the user devices 1910-1940 may correspond to user device 210, and telecommunications network 1950 may correspond to network 220.

Dan 1920 owns a window replacement business and is interested in finding new customers and generating business. As such, Dan 1920 periodically broadcasts profile messages to potential customers 1930-1940 over communications network 1950. Dan' profile messages typically include discounts availability information regarding his window replacement services. Jane 1910 would like to hire someone to install a new window in her home 1960. Therefore, as depicted in UI 1970, Jane 1910 decides to update her user profile to include the key word "New Window." Before long, Jane begins to receive profile messages from Dan 1920, as illustrated in UI 1980. Satisfied with her selection of offers, Jane accepts one of Dan's offers by marking the appropriate discount and selecting the Accept Offer button. As a result, Dan is notified of Jane's decision and may schedule his work accordingly. Since Jane is no longer interested in receiving window replacement offers, she again accesses her user profile and removes the phrase "New Window" from her profile.

Figure 20:
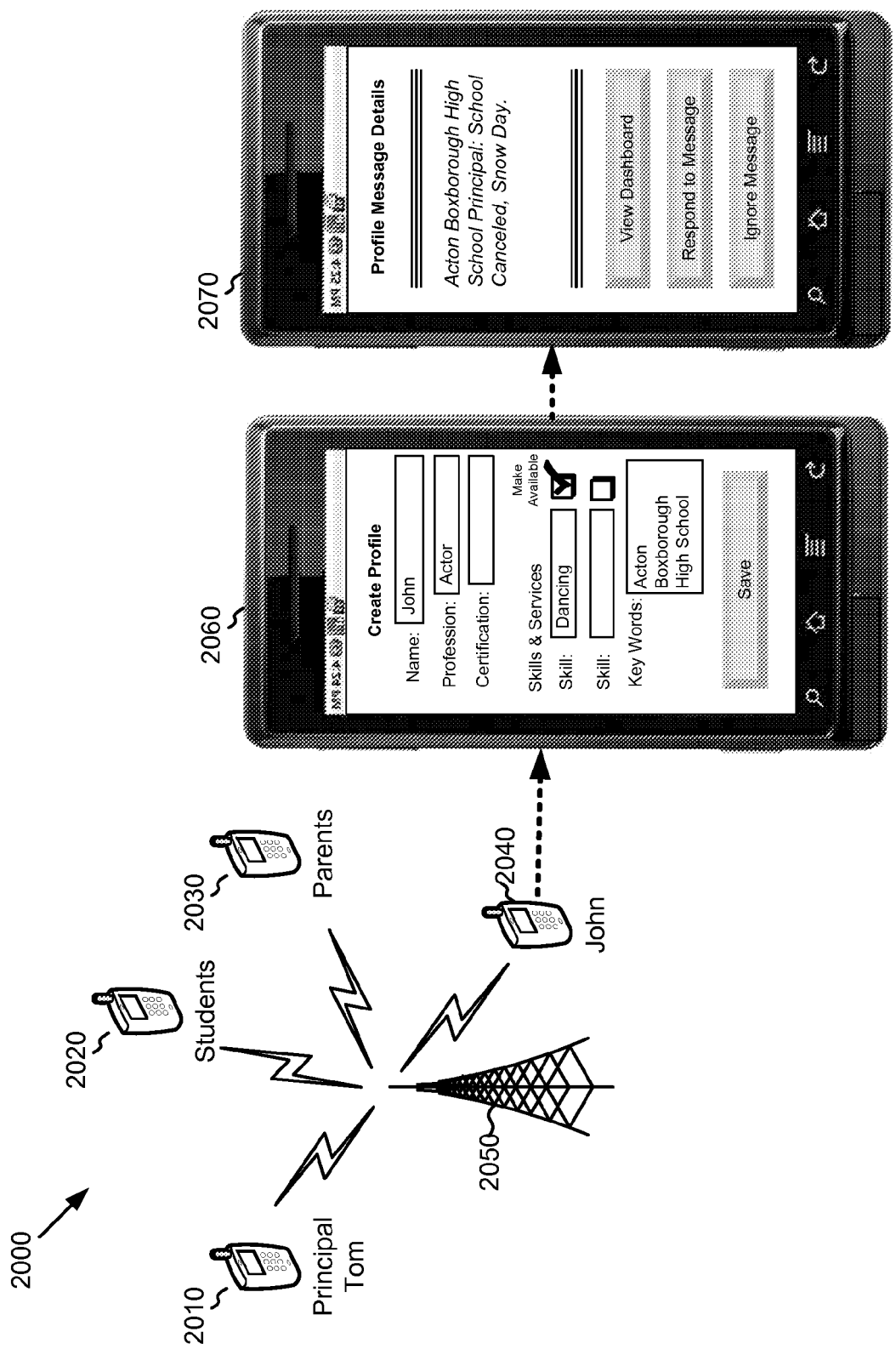

FIG. 20 is a diagram that illustrates an example implementation 2000 of systems and/or methods described herein. As depicted, implementation 2000 includes user devices 2010-2040 (also referred to as Principal Tom 2010, Students 2020, Parents 2030, and John 2040) and a telecommunications network 2050. Implementation 2000 also includes example UI 2060 for creating a user profile and example UI 2070 for receiving a notification, which may be implemented on user device 2040. In certain implementations, each of the user devices 2010-2030 may correspond to user device 210, and telecommunications network 2050 may correspond to network 220.

Principal Tom 2010 is a high school principal at Acton Boxborough High School, and John 2040 has a daughter that is a student at the high school. Via telecommunications network 2050, Principal Tom 2010 periodically sends out notices and announcements to parents 2030 and students 2020 using profile messages. As such, in order to receive Principal Tom's notices and announcements, John 2040 accesses the user profile and enters "Acton Boxborough High School" in the Key Words text box, as illustrated in UI 2060. A few days later, as illustrated in UI 2070, John 2040 receives a profile message from Principal Tom 2010 stating that "Acton Boxborough High School Principal: School Canceled, Snow Day."

As described above, in an implementation, user profiles may be used to search for and communicate with, in real-time, one or more individuals in a given geographic area. In certain implementations, a first user device may communicate with a second user device by broadcasting a profile message in a geographic area. Upon receiving the profile message, the second user device may determine whether the profile message matches a user profile of the second user device. If the profile message does not match the user profile, then the second user device may disregard the profile message. However, if the profile message matches the user profile of the second user device, then the second user device may notify the user of the second user device and enable the user to respond to the profile message.

The foregoing description of implementations provides illustration and description, but is not intended to be exhaustive or to limit the implementations to the precise form disclosed. Modifications and variations are possible in light of the above teachings or may be acquired from practice of these implementations.

For example, while series of blocks have been described with regard to FIGS. 7, 9, 11, and 13-15, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain implementations may involve a "component" that performs one or more functions. These components may include hardware, such as an ASIC or a FPGA, or a combination of hardware and software.

Even though particular combinations of features are recited in the claims and/or disclosed in the specification, these combinations are not intended to limit disclosure of the possible implementations. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:

receiving, by a user device, a profile message comprising target profile data and geographic data, the target profile data comprising at least one key word selected by an originator of the profile message to correspond to a user profile of at least one user of interest located within a geographic distance, from the originator, defined by the geographic data;

determining, by the user device, whether the target profile data corresponds to user profile data associated with a user of the user device;

determining, by the user device, whether a current geographic location of the user device is within the geographic distance defined by the geographic data;

notifying, by the user device, the user when the target profile data corresponds to the user profile data and the current location of the user device is within the geographic distance defined by the geographic data;
accessing a memory comprising response history data corresponding to the profile message, wherein the response history data comprises a quantity of outstanding matches, a quantity of affirmative responses, and a quantity of negative responses;
communicating and displaying at least some of the response history data to the user via a dynamic dashboard, wherein the dynamic dashboard displays at least options to respond affirmatively, respond to the profile message, locate the originator, and ignore the profile message; and
enabling, by the user device, the user to respond to the profile message via the dynamic dashboard.

2. The method of claim 1, further comprising:
determining whether the profile message corresponds to a previously received profile message; and
ignoring the profile message when the profile message corresponds to a previously received profile message.

3. The method of claim 1, further comprising:
updating the memory in accordance with a response of the user, via the dynamic dashboard, regarding the profile message.

4. The method of claim 1, further comprising:
obtaining geographic data corresponding to an origin of the profile message; and
providing the user with the obtained geographic data via the dynamic dashboard.

5. The method of claim 1, further comprising:
generating at least one contact profile, wherein each of the at least one contact profile comprises contact availability data;
accessing the contact availability data corresponding to at least one contact;
determining whether the at least one contact is available; and
communicating the profile message to each of the at least one contact when the at least one contact is available.

6. The method of claim 1, where the dynamic dashboard comprises a user device interface enabling the user to respond to the profile message by contacting the originator of the profile message via text, telephone call, or video conference, or by displaying a map comprising a current geographic location of the user device, a current geographic location of the originator, and a route for traveling from the current geographic location of the user device to the current geographic location of the originator.

7. The method of claim 1, where enabling the user to respond to the profile message includes at least one of:
providing, via the dynamic dashboard, an option to place a telephone call to the originator,
receiving selection of the option to place the telephone call, and
initiating the telephone call to the originator in response to the selection;
providing, via the dynamic dashboard, an option to send a voicemail message to the originator,
recording the voicemail message, and
sending the voicemail message to the originator in response to a selection to send the recorded voicemail;
providing, via the dynamic dashboard, an option to send a text message to the originator,
receiving a text message input from the user,
sending the text message to the originator in response to a selection to send the text message;
providing, via the dynamic dashboard, an option to send an instant message to the originator,
receiving an instant message input from the user, and
sending the instant message to the originator in response to a selection to send the instant message; or
providing, via the dynamic dashboard, an option to initiate a video conference,
receiving selection of the option to initiate the video conference, and
initiating the video conference in response to the selection.

8. A user device, comprising:
a memory to store user profile data corresponding to a user of the user device; and
a processor, connected to the memory, to:
  receive a profile message comprising target profile data;
  determine whether the target profile data corresponds to the user profile data;
notify the user when the target profile data corresponds to the user profile data;
  access response history data corresponding to the profile message, wherein the response history data comprises:
    a quantity of outstanding matches,
    a quantity of affirmative responses, and
    a quantity of negative responses;
  communicate and display for selection at least some of the response history data to the user via a dynamic dashboard, wherein the dynamic dashboard displays at least options to respond affirmatively, respond to the profile message, locate the sender of the profile message, and ignore the profile message; and
  when the option to respond to the profile message is selected, the dynamic dashboard is to enable the user to respond to the profile message by contacting an originator of the profile message via text, telephone call, or video conference, or by displaying a map comprising a current geographical location of the user device, a current geographical location of the originator, and a route for traveling from the current geographic location of the user to the current geographic location of the originator.

9. The user device of claim 8, where the processor is to:
determine whether the profile message corresponds to a previously received profile message, and
ignore the profile message when the profile message corresponds to a previously received profile message.

10. The user device of claim 8, where the processor is to:
update the memory in accordance with a response of the user, via the dynamic dashboard, regarding the profile message.

11. The user device of claim 8, where the processor is to:
receive user profile data from the user of the user device,
  generate the user profile based on the user profile data,
  receive profile availability data from the user of the user device, and
  designate a user profile availability status based on the profile availability data, the user profile availability status specifying whether the user will be notified of profile messages with target profile data corresponding to the user profile data.

12. The user device of claim 8, where the processor is to:
generate at least one contact profile, where each of the at least one contact profile comprises contact availability data,
access the contact availability data corresponding to at least one contact of the user,
determine whether the at least one contact is available, and communicate the profile message to each of the at least one contact when the contact is available.

13. The user device of claim 8, where the processor is to:
receive target profile data from the user of the user device, generate a profile message based on the target profile data, and
broadcast the profile message based on geographic data received from the user.

14. A method, comprising:
receiving, by a user device, a profile message comprising target profile data and geographic data, the target profile data comprising at least one key word selected by an originator of the profile message to correspond to a user profile of at least one person of interest within a geographic distance from the originator defined by the geographic data;
determining, by the user device, whether the target profile data corresponds to user profile data associated with a user of the user device;
determining, by the user device, whether a current geographic location of the user device is within the geographic distance defined by the geographic data;
notifying, by the user device, the user when the target profile data corresponds to the user profile data and the current geographic location of the user device is within the geographic distance defined by the geographic data;
accessing a memory comprising response history data corresponding to the profile message, the response history data comprising information related to affirmative responses or negative responses that were received from other users in response to the profile message;
communicating and providing at least some of the response history data to the user via a dynamic dashboard,
wherein the dynamic dashboard displays options to respond affirmatively, respond to the profile message, locate the originator, and ignore the profile message; and
enabling, when the option to respond to the profile message is selected, the dynamic dashboard to allow the user to respond to the profile message by contacting the originator of the profile message via text, telephone call, or video conference, or by displaying a map comprising the current geographic location of the user device, a current geographic location of the originator, and a route for traveling from the current geographic location of the user to the current geographic location of the originator.

15. The method of claim 14, further comprising:
determining whether the profile message corresponds to a previously received profile message; and
ignoring the profile message when the profile message corresponds to the previously received profile message.

16. The method of claim 14, further comprising:
updating the memory in accordance with a response of the user, via the dynamic dashboard, regarding the profile message.

17. The method of claim 14, where enabling the user to respond to the profile message includes at least one of:
providing, via the dynamic dashboard, an option to place a telephone call to the originator, receiving selection of the option to place the telephone call, and initiating the telephone call to the originator in response to the selection;
providing, via the dynamic dashboard, an option to send a voicemail message to the originator, recording the voicemail message, and sending the voicemail message to the originator in response to a selection to send the recorded voicemail;
providing, via the dynamic dashboard, an option to send a text message to the originator, receiving a text message input from the user, and sending the text message to the originator in response to a selection to send the text message;
providing, via the dynamic dashboard, an option to send an instant message to the originator, receiving an instant message input from the user, and sending the instant message to the originator in response to a selection to send the instant message; or
providing, via the dynamic dashboard, an option to initiate a video conference, receiving selection of the option to initiate the video conference, and initiating the video conference in response to the selection.

18. The method of claim 14, further comprising:
generating at least one contact profile, where each of the at least one contact profile comprises contact availability data;
accessing contact availability data corresponding to at least one contact of the user;
determining whether the at least one contact is available; and
sending the profile message to each of the at least one contact when the contact is available.

19. A method, comprising:
receiving, by a user device, user profile data comprising at least one key word selected by a user to correspond to target profile data of at least one profile message of interest;
generating, by the user device, a user profile based on the user profile data, the user profile comprising the at least one key word;
receiving, by the user device, profile availability data;
designating, by the user device, a user profile availability status based on the profile availability data, the user profile availability status specifying whether the user will be notified of profile messages with target profile data corresponding to the at least one key word;
accessing, by the user device, stored response information corresponding to the profile message; and
enabling a dynamic dashboard when the user profile availability status specifies that the user will be notified,
wherein the dynamic dashboard displays at least options to respond affirmatively, respond to the profile message, locate the sender, and ignore the profile message, and
wherein the dynamic dashboard displays response information that comprises a quantity of outstanding matches, a quantity of affirmative responses, and a quantity of negative responses.

20. The method of claim 19, further comprising:
receiving a profile message comprising target profile data and geographic data, the target profile data selected by an originator of the profile message to correspond to a user profile of at least one person of interest within a geographic distance from the originator defined by the geographic data;
determining whether the target profile data corresponds to the at least one key word;

determining whether a current geographic location of the user device is within the geographic distance defined by the geographic data;

notifying the user when the target profile data corresponds to the at least one key word and the current location of the user is within the geographic distance defined by the geographic data; and enabling the user to respond to the profile message via a dynamic dashboard.

21. The method of claim 20, where the dynamic dashboard enables the user to respond to the profile message by contacting the originator of the profile message via text, telephone call, or video conference, or by displaying a map comprising the current geographic location of the user device, a current geographic location of the originator, and a route for traveling from the current geographic location of the user device to the current geographic location of the originator.

* * * * *